US008608609B2

(12) United States Patent
Sherrill et al.

(10) Patent No.: US 8,608,609 B2
(45) Date of Patent: *Dec. 17, 2013

(54) SYMMETRICAL TRACTION DRIVE

(75) Inventors: Ryan Sherrill, Fort Collins, CO (US); Sterling Holman, Fort Collins, CO (US); Ed VanDyne, Loveland, CO (US); Wayne Penfold, Fort Collins, CO (US)

(73) Assignee: VanDyne SuperTurbo, Inc., Loveland, CO (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/336,346

(22) Filed: Dec. 23, 2011

(65) Prior Publication Data

US 2012/0165151 A1    Jun. 28, 2012

Related U.S. Application Data

(60) Provisional application No. 61/427,084, filed on Dec. 23, 2010.

(51) Int. Cl.
*F16H 57/04* (2010.01)
*F16H 13/14* (2006.01)

(52) U.S. Cl.
USPC .............................. 475/159; 475/195; 476/8

(58) Field of Classification Search
USPC .................... 475/114, 183, 159, 195
See application file for complete search history.

(56) References Cited

U.S. PATENT DOCUMENTS

| 236,150 | A | | 1/1881 | Fitch |
| 747,016 | A | * | 12/1903 | Sundh et al. ................. 475/149 |
| 1,526,493 | A | | 2/1925 | Dolton |
| 1,550,796 | A | | 8/1925 | Gammons |
| 1,686,446 | A | | 10/1928 | Gilman |
| 1,691,625 | A | | 11/1928 | Chilton |

(Continued)

FOREIGN PATENT DOCUMENTS

| EP | 0517675 | 8/1995 |
| EP | 1400667 | 3/2004 |

(Continued)

OTHER PUBLICATIONS

PCT Application Serial No. PCT/US09/51742, filed with the U.S. Receiving Office on Jul. 24, 2009.

(Continued)

*Primary Examiner* — Dirk Wright
(74) *Attorney, Agent, or Firm* — William W. Cochran; Cochran Freund & Young LLC

(57) ABSTRACT

Disclosed is a symmetrical traction drive that utilizes multi-diameter rollers having traction surfaces for transferring rotational mechanical energy between the shaft and a transfer gear. Multi-diameter rollers are mounted in carriers disposed between two substantially symmetrical ring gears. Sloped traction surfaces of the ring gears mate with inner traction surfaces on both sides of the multi-diameter rollers. Since force is applied to the inner traction surfaces on both sides of the multi-diameter rollers, forces are substantially equalized on each side of the multi-diameter rollers. An outer traction surface of the multi-diameter roller interfaces with a traction surface on the shaft. Speed reduction ratios of at least 20:1 or greater can be achieved. The high speed drive may include exhaust turbines, steam turbines, including a Tesla turbine or Schumacher turbine, compressors, combinations of turbines and compressors, high speed pumps, dentist drills, or other devices that operate with high rotational speed.

64 Claims, 31 Drawing Sheets

(56) References Cited

U.S. PATENT DOCUMENTS

| | | | | |
|---|---|---|---|---|
| 1,718,846 A | | 6/1929 | Arter | |
| 1,737,997 A | * | 12/1929 | Garrard | 475/183 |
| 1,811,921 A | * | 6/1931 | Edmunds | 475/183 |
| 1,864,635 A | * | 6/1932 | Beutner et al. | 475/11 |
| 1,979,170 A | | 10/1934 | Nardone | |
| 2,076,057 A | | 4/1937 | Almen | |
| 2,173,595 A | | 9/1939 | Schutte | |
| 2,216,494 A | | 10/1940 | Kurtz et al. | |
| 2,278,181 A | | 3/1942 | Lieberherr | |
| 2,397,941 A | | 4/1946 | Birkigt | |
| 2,412,351 A | | 12/1946 | Mount | |
| 2,542,539 A | | 2/1951 | Kuhrt et al. | |
| 2,573,258 A | | 10/1951 | Gerritsen | |
| 2,585,698 A | | 2/1952 | Schneider | |
| 2,585,968 A | | 2/1952 | Schneider | |
| 2,585,986 A | | 2/1952 | Andreasson | |
| 2,586,725 A | | 2/1952 | Schottler | |
| 2,590,800 A | | 3/1952 | Stephenson | |
| 2,620,621 A | | 12/1952 | Neftel | |
| 2,652,006 A | | 9/1953 | Simonson | |
| 2,696,888 A | | 12/1954 | Chillson et al. | |
| 2,701,970 A | | 2/1955 | Kraus | |
| 2,803,507 A | | 8/1957 | Mempel et al. | |
| 2,874,592 A | | 2/1959 | Oehrli | |
| 2,878,692 A | | 3/1959 | Wolf | |
| 2,901,924 A | | 9/1959 | Banker | |
| 2,905,026 A | | 9/1959 | Oehrli | |
| 2,913,932 A | | 11/1959 | Oehrli | |
| 2,941,422 A | | 6/1960 | Barish | |
| 2,973,671 A | | 3/1961 | Elkins | |
| 3,035,460 A | * | 5/1962 | Guichard | 475/186 |
| 3,044,683 A | | 7/1962 | Woollenweber | |
| 3,163,984 A | | 1/1965 | Dumont | |
| 3,203,278 A | | 8/1965 | General | |
| 3,229,538 A | * | 1/1966 | Schottler | 476/8 |
| 3,237,468 A | | 3/1966 | Schottler | |
| 3,246,531 A | | 4/1966 | Kashihara | |
| 3,248,960 A | | 5/1966 | Schottler | |
| 3,293,945 A | | 12/1966 | Stockton | |
| 3,420,122 A | | 1/1969 | Okabe | |
| 3,423,927 A | | 1/1969 | Scherenberg | |
| 3,494,224 A | | 2/1970 | Fellows et al. | |
| 3,504,574 A | * | 4/1970 | Okabe | 475/189 |
| 3,516,305 A | * | 6/1970 | Chery | 475/186 |
| 3,673,797 A | | 7/1972 | Wilkinson | |
| 3,676,999 A | | 7/1972 | Oldfield | |
| 3,707,888 A | | 1/1973 | Schottler | |
| 3,745,844 A | | 7/1973 | Schottler | |
| 3,793,907 A | * | 2/1974 | Nakamura et al. | 475/114 |
| 3,802,284 A | * | 4/1974 | Sharpe et al. | 476/10 |
| 3,988,894 A | | 11/1976 | Melchior | |
| 4,052,915 A | * | 10/1977 | Kraus | 475/195 |
| 4,060,010 A | * | 11/1977 | Heden | 475/183 |
| 4,089,569 A | | 5/1978 | Rempel | |
| 4,098,145 A | * | 7/1978 | Dickinson | 475/186 |
| 4,215,549 A | | 8/1980 | Daeschner | |
| 4,270,400 A | | 6/1981 | Fodor | |
| 4,287,791 A | | 9/1981 | Numazawa et al. | |
| 4,302,988 A | * | 12/1981 | Takahashi et al. | 475/114 |
| 4,312,183 A | | 1/1982 | Regar | |
| 4,314,485 A | | 2/1982 | Adams | |
| 4,345,486 A | | 8/1982 | Olesen | |
| 4,378,677 A | | 4/1983 | Zumstein | |
| 4,398,436 A | | 8/1983 | Fisher | |
| 4,424,726 A | | 1/1984 | Galbraith | |
| 4,449,370 A | | 5/1984 | Ream | |
| 4,483,216 A | * | 11/1984 | Takahashi et al. | 475/195 |
| 4,489,992 A | | 12/1984 | Brandenstein et al. | |
| 4,541,305 A | * | 9/1985 | Hamabe et al. | 475/184 |
| 4,570,501 A | | 2/1986 | de Bris Perry | |
| 4,592,247 A | | 6/1986 | Mutschler | |
| 4,593,574 A | | 6/1986 | Sinn et al. | |
| 4,616,481 A | | 10/1986 | Melchior et al. | |
| 4,620,455 A | * | 11/1986 | Kraus | 475/159 |
| 4,667,525 A | | 5/1987 | Schottler | |
| 4,693,134 A | | 9/1987 | Kraus | |
| 4,700,542 A | | 10/1987 | Wang | |
| 4,718,781 A | | 1/1988 | Gerard | |
| 4,729,225 A | | 3/1988 | Bucher | |
| 4,856,374 A | | 8/1989 | Kreuzer | |
| 5,025,671 A | * | 6/1991 | Kraus | 475/195 |
| 5,033,269 A | | 7/1991 | Smith | |
| 5,037,361 A | * | 8/1991 | Takahashi | 475/195 |
| 5,041,066 A | * | 8/1991 | Wood | 475/195 |
| 5,385,514 A | | 1/1995 | Dawe | |
| 5,397,279 A | | 3/1995 | McCotter, Jr. | |
| 5,458,855 A | | 10/1995 | Gillbrand | |
| 5,551,929 A | | 9/1996 | Fritsch | |
| 5,560,207 A | | 10/1996 | Ramsden et al. | |
| 5,586,540 A | | 12/1996 | Marzec et al. | |
| 5,688,201 A | * | 11/1997 | Zhou | 475/183 |
| 5,713,204 A | | 2/1998 | Kadlicko | |
| 5,724,813 A | | 3/1998 | Fenelon et al. | |
| 5,729,978 A | | 3/1998 | Hiereth et al. | |
| 5,775,417 A | | 7/1998 | Council | |
| 5,887,434 A | | 3/1999 | Arnell et al. | |
| 5,974,792 A | | 11/1999 | Isobe | |
| 6,041,602 A | | 3/2000 | Dickey | |
| 6,050,094 A | | 4/2000 | Udd et al. | |
| 6,050,095 A | | 4/2000 | Blake | |
| 6,095,940 A | * | 8/2000 | Ai et al. | 475/197 |
| 6,145,313 A | | 11/2000 | Arnold | |
| 6,227,180 B1 | | 5/2001 | Hoffmann et al. | |
| 6,343,473 B1 | | 2/2002 | Kanesaka | |
| 6,406,399 B1 | * | 6/2002 | Ai | 475/183 |
| 6,408,626 B1 | | 6/2002 | Arnell | |
| 6,470,864 B2 | | 10/2002 | Kim et al. | |
| 6,601,388 B1 | | 8/2003 | Gladden | |
| 6,651,432 B1 | | 11/2003 | Gray, Jr. | |
| 6,681,574 B2 | | 1/2004 | Berglund et al. | |
| 6,725,653 B2 | | 4/2004 | Brown et al. | |
| 6,729,315 B2 | | 5/2004 | Onodera et al. | |
| 6,857,263 B2 | | 2/2005 | Gray, Jr. et al. | |
| 6,871,498 B1 | | 3/2005 | Allen et al. | |
| 6,912,852 B2 | | 7/2005 | Gottemoller et al. | |
| 6,960,147 B2 | | 11/2005 | Kolstrup | |
| 6,994,531 B2 | | 2/2006 | Dairokuno et al. | |
| 7,025,042 B2 | | 4/2006 | Gray, Jr. | |
| 7,032,382 B2 | | 4/2006 | Onodera et al. | |
| 7,055,507 B2 | | 6/2006 | Kelley, Jr. | |
| 7,086,979 B2 | * | 8/2006 | Frenken | 475/182 |
| 7,237,532 B2 | | 7/2007 | Gray, Jr. | |
| 7,455,617 B2 | | 11/2008 | Miller et al. | |
| 7,491,149 B2 | | 2/2009 | Greenwood et al. | |
| 7,492,594 B2 | | 2/2009 | Pal | |
| 7,540,818 B2 | | 6/2009 | Miller et al. | |
| 8,062,161 B2 | * | 11/2011 | Marumoto | 475/191 |
| 8,251,853 B2 | * | 8/2012 | Vojacek et al. | 475/195 |
| 8,382,630 B2 | * | 2/2013 | Brinks et al. | 475/185 |
| 2003/0196436 A1 | | 10/2003 | Hoecker et al. | |
| 2005/0277514 A1 | | 12/2005 | Hiroyuki et al. | |
| 2006/0032225 A1 | | 2/2006 | VanDyne | |
| 2006/0070382 A1 | | 4/2006 | Karlsson | |
| 2006/0157291 A1 | | 7/2006 | Puiu et al. | |
| 2007/0062189 A1 | | 3/2007 | Keppeler et al. | |
| 2007/0130094 A1 | | 6/2007 | Lien et al. | |
| 2007/0130946 A1 | | 6/2007 | Winsor et al. | |
| 2007/0130948 A1 | | 6/2007 | Boehm et al. | |
| 2007/0197337 A1 | | 8/2007 | Miller et al. | |
| 2007/0275809 A1 | | 11/2007 | Miller et al. | |
| 2008/0141810 A1 | | 6/2008 | Miller et al. | |
| 2008/0236150 A1 | | 10/2008 | Jarvi | |
| 2008/0276756 A1 | | 11/2008 | Marumoto | |
| 2008/0282699 A1 | | 11/2008 | Barthelet et al. | |
| 2009/0277431 A1 | | 11/2009 | Nitzke et al. | |
| 2010/0031935 A1 | | 2/2010 | VanDyne et al. | |
| 2010/0174456 A1 | | 7/2010 | Beaudoin et al. | |
| 2010/0236503 A1 | | 9/2010 | Bernt et al. | |
| 2013/0017920 A1 | * | 1/2013 | Sherrill et al. | 475/183 |

FOREIGN PATENT DOCUMENTS

| | | |
|---|---|---|
| EP | 01300946 | 12/2004 |
| EP | 0994245 | 6/2005 |

(56) References Cited

FOREIGN PATENT DOCUMENTS

| | | |
|---|---|---|
| EP | 1550796 | 7/2005 |
| EP | 1711699 | 3/2007 |
| GB | 0206845 | 2/1924 |
| GB | 557970 | 12/1943 |
| JP | 61164039 | 7/1986 |
| JP | 3153947 | 7/1991 |
| WO | 2004072449 | 8/2004 |
| WO | 2006022635 | 3/2006 |
| WO | 2008008379 | 1/2008 |
| WO | 2011120520 | 10/2011 |

OTHER PUBLICATIONS

U.S. Appl. No. 12/536,421, filed Aug. 5, 2009.
U.S. Appl. No. 61/086,401, filed Aug. 5, 2008.
U.S. Appl. No. 61/231,624, filed Aug. 5, 2009.
International Search Report, mailed Apr. 27, 2012, in PCT Application Serial No. PCT/US2011/67151.

* cited by examiner

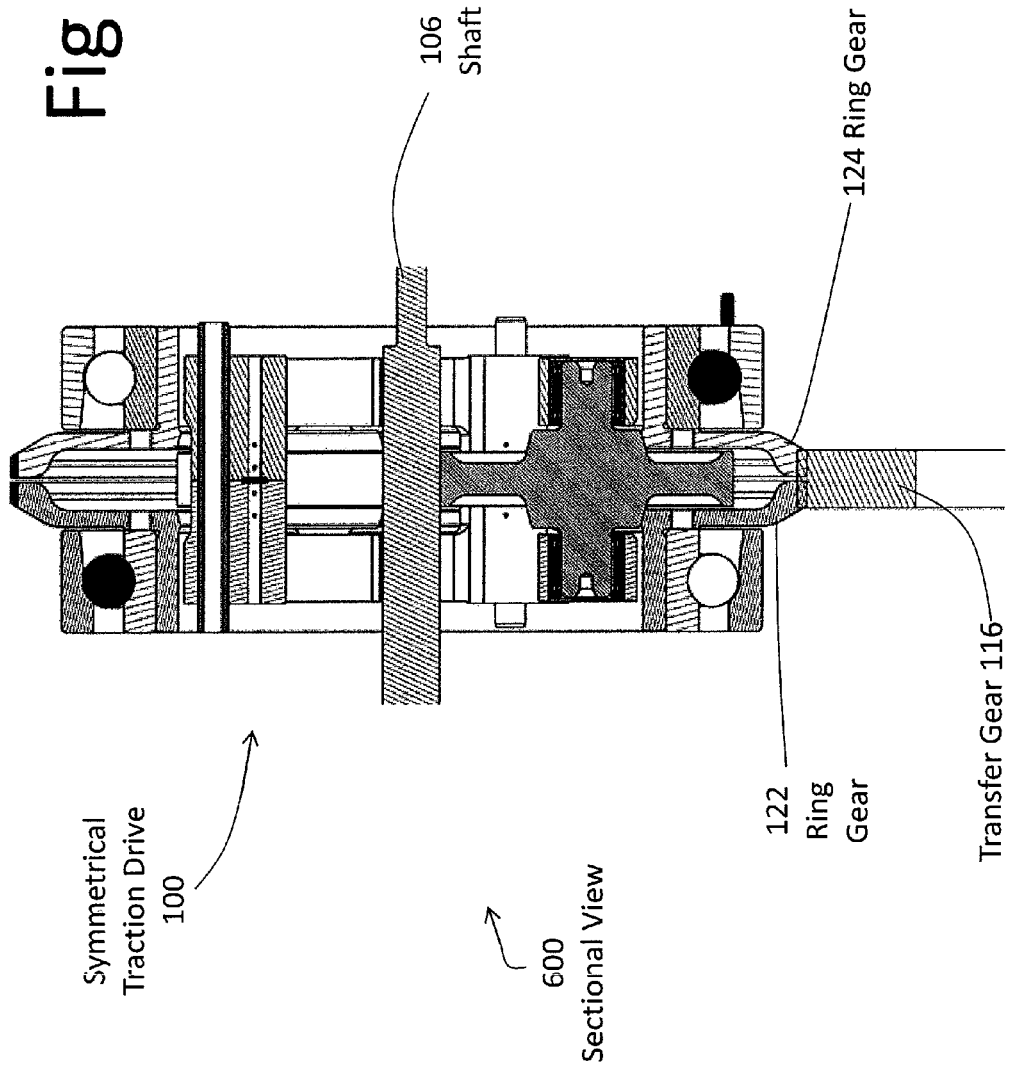

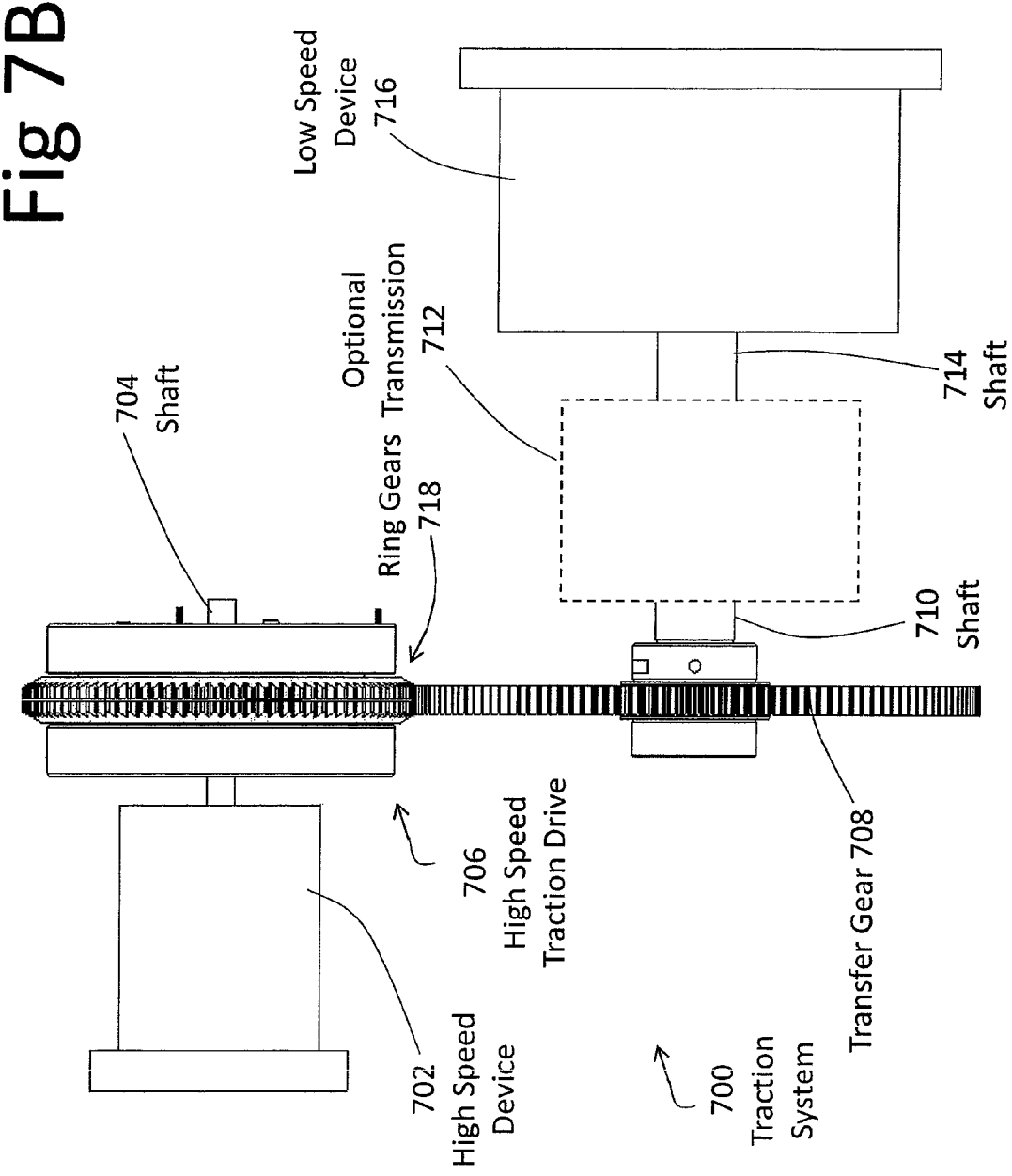

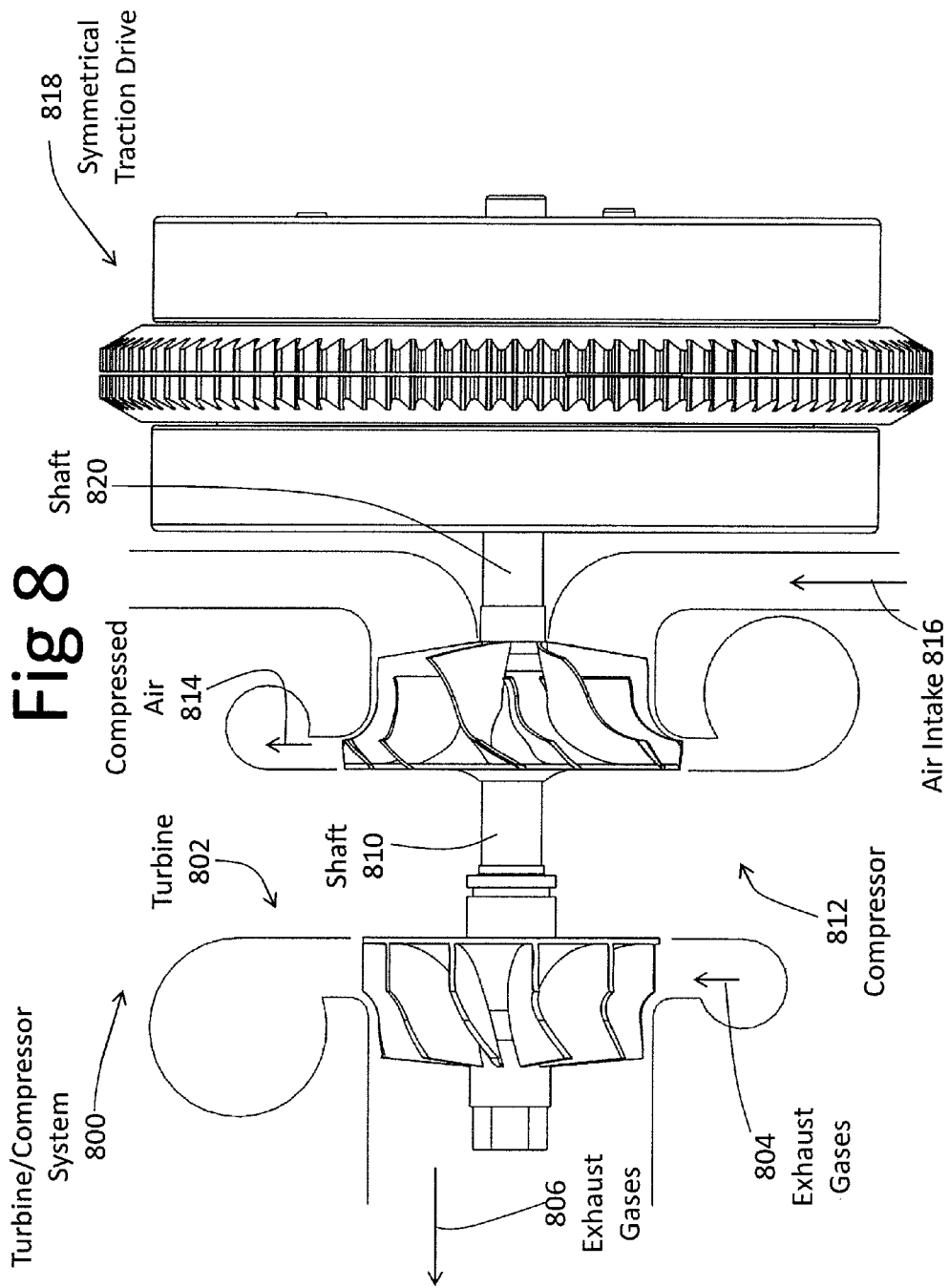

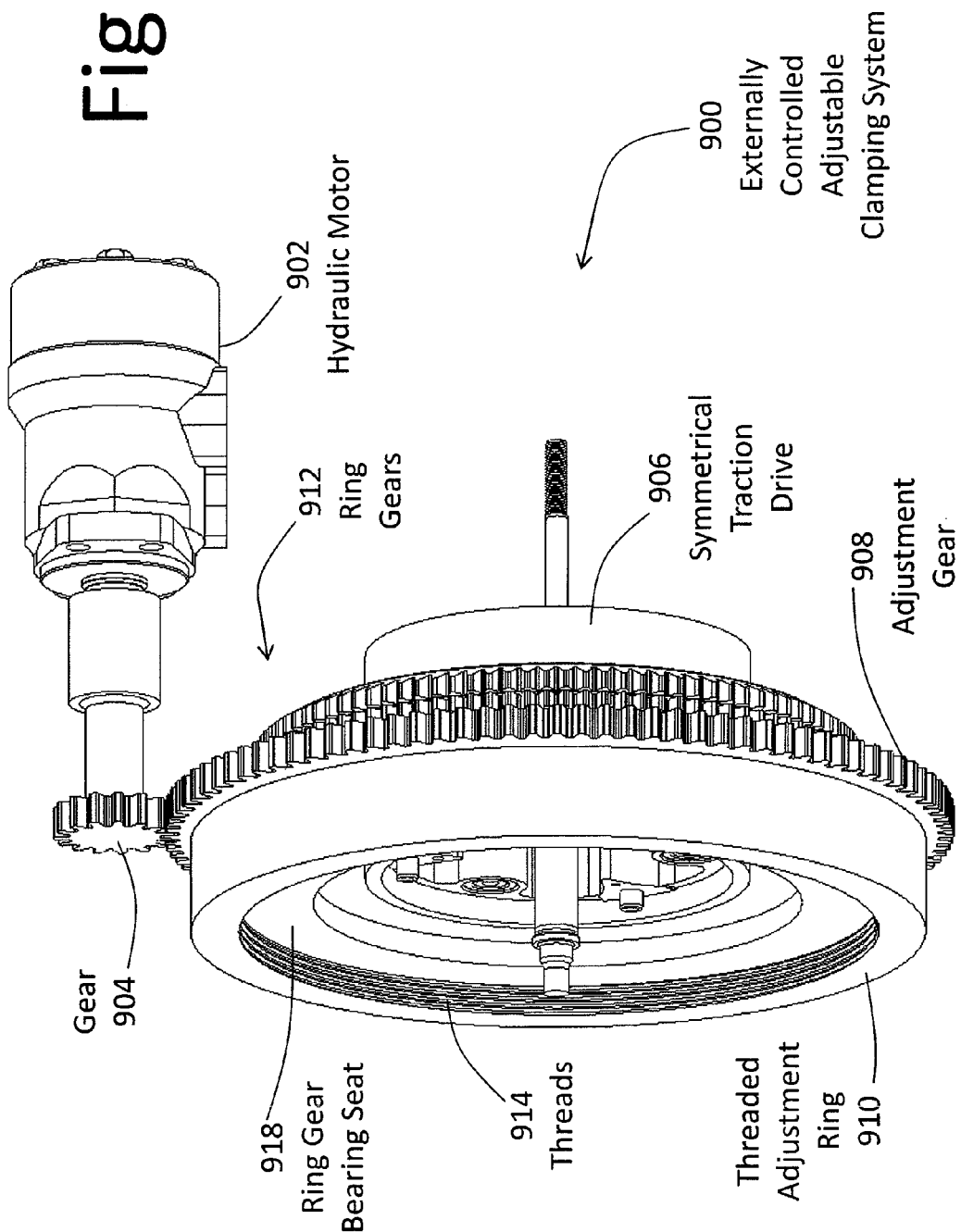

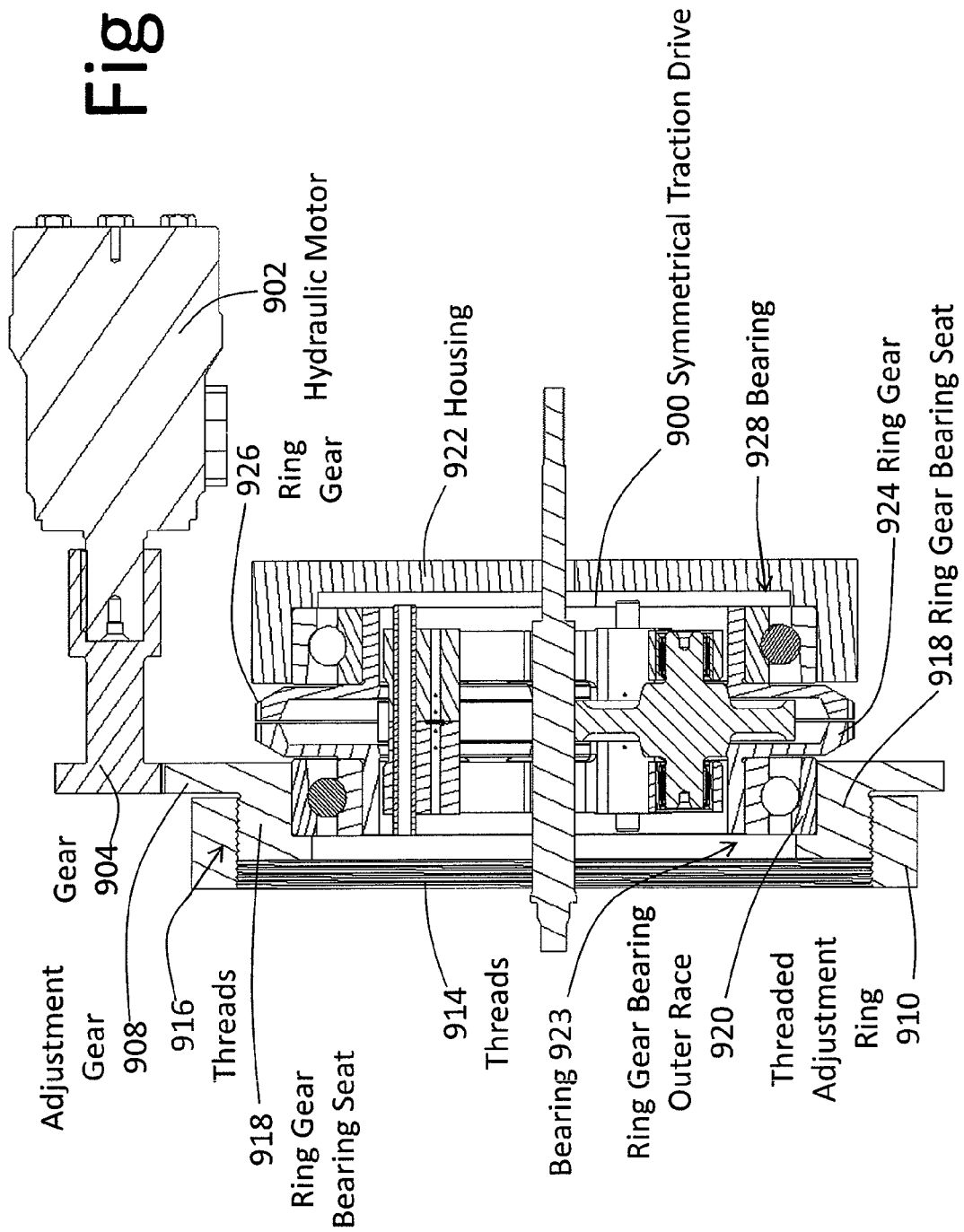

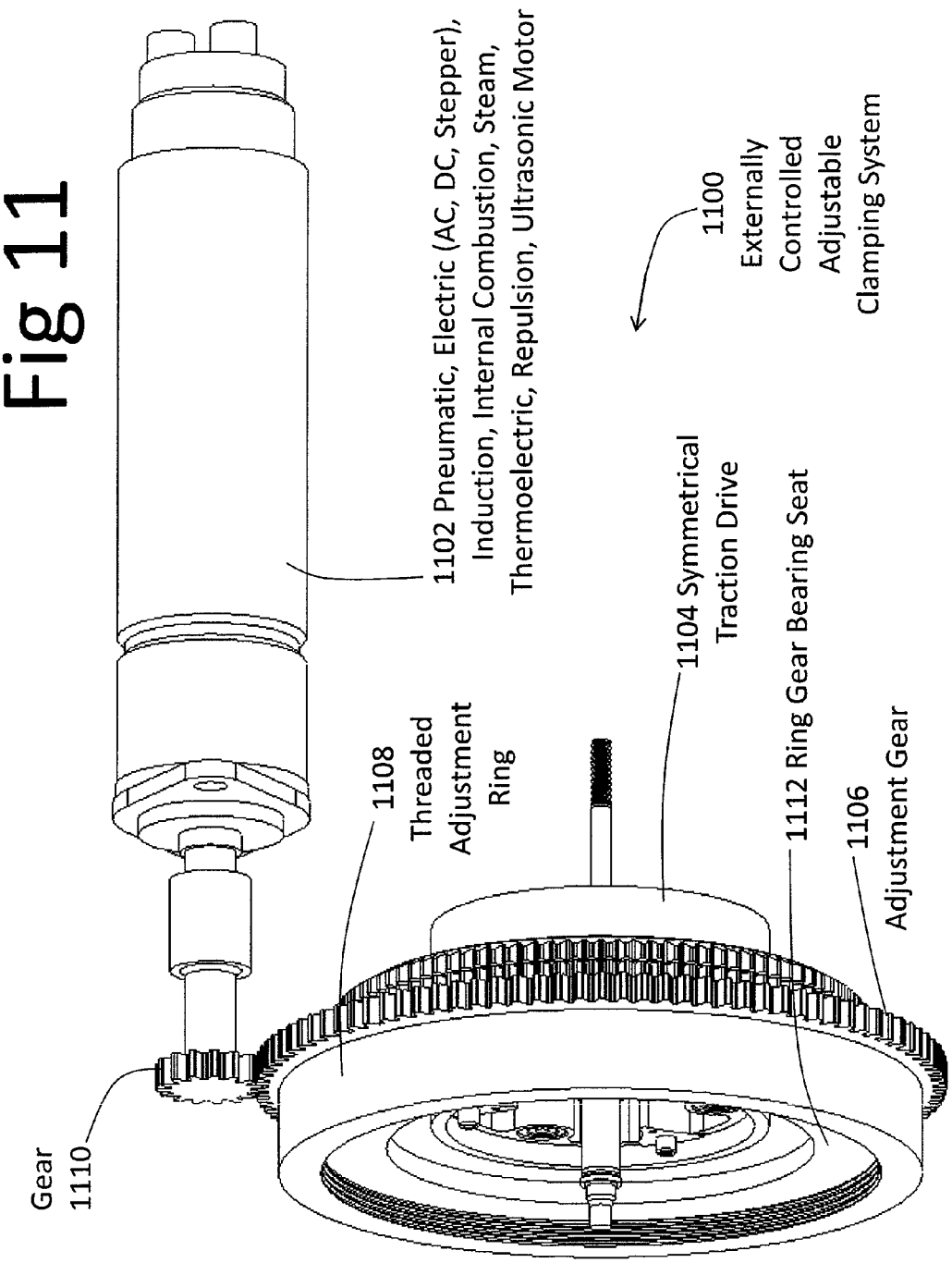

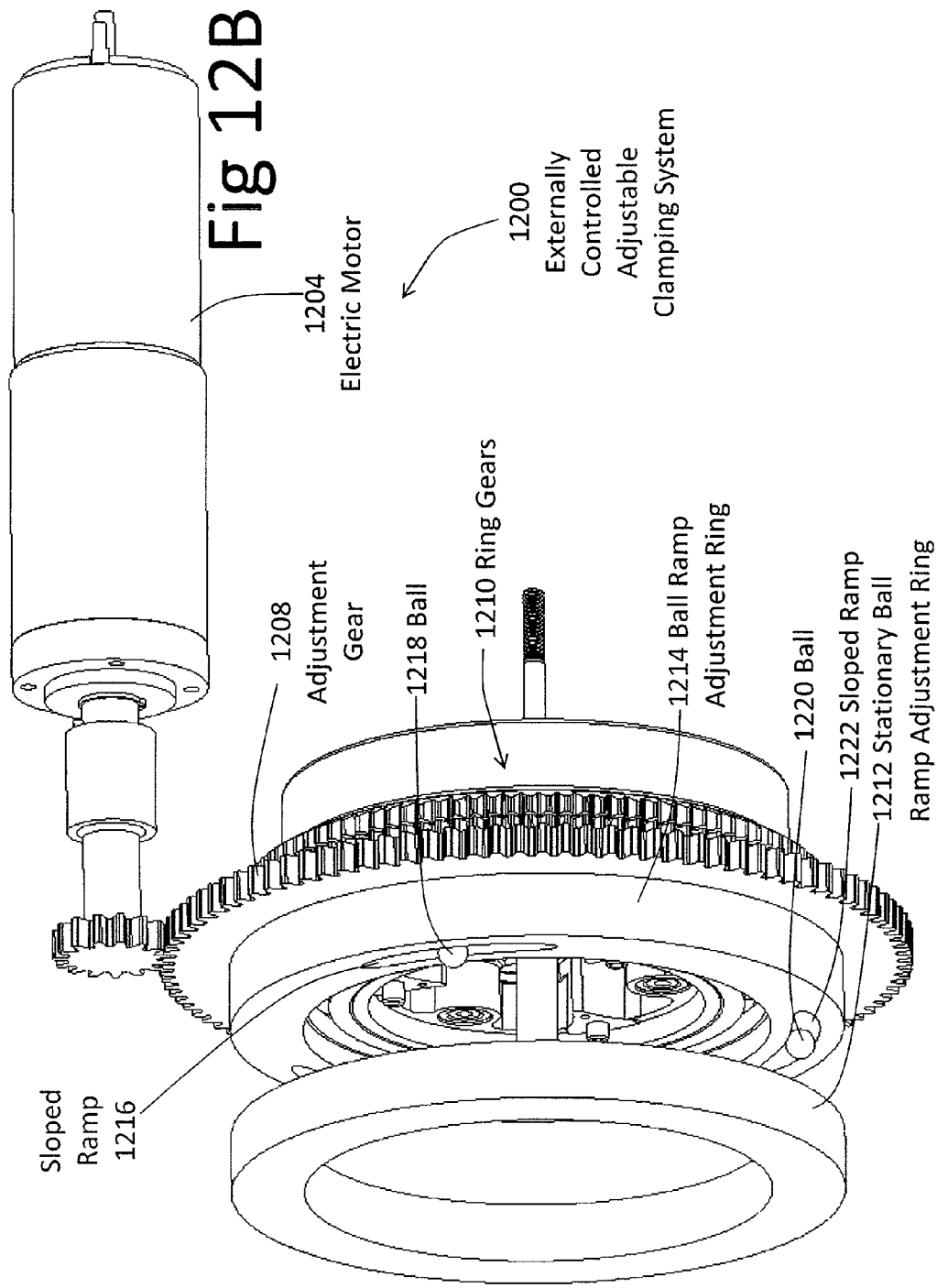

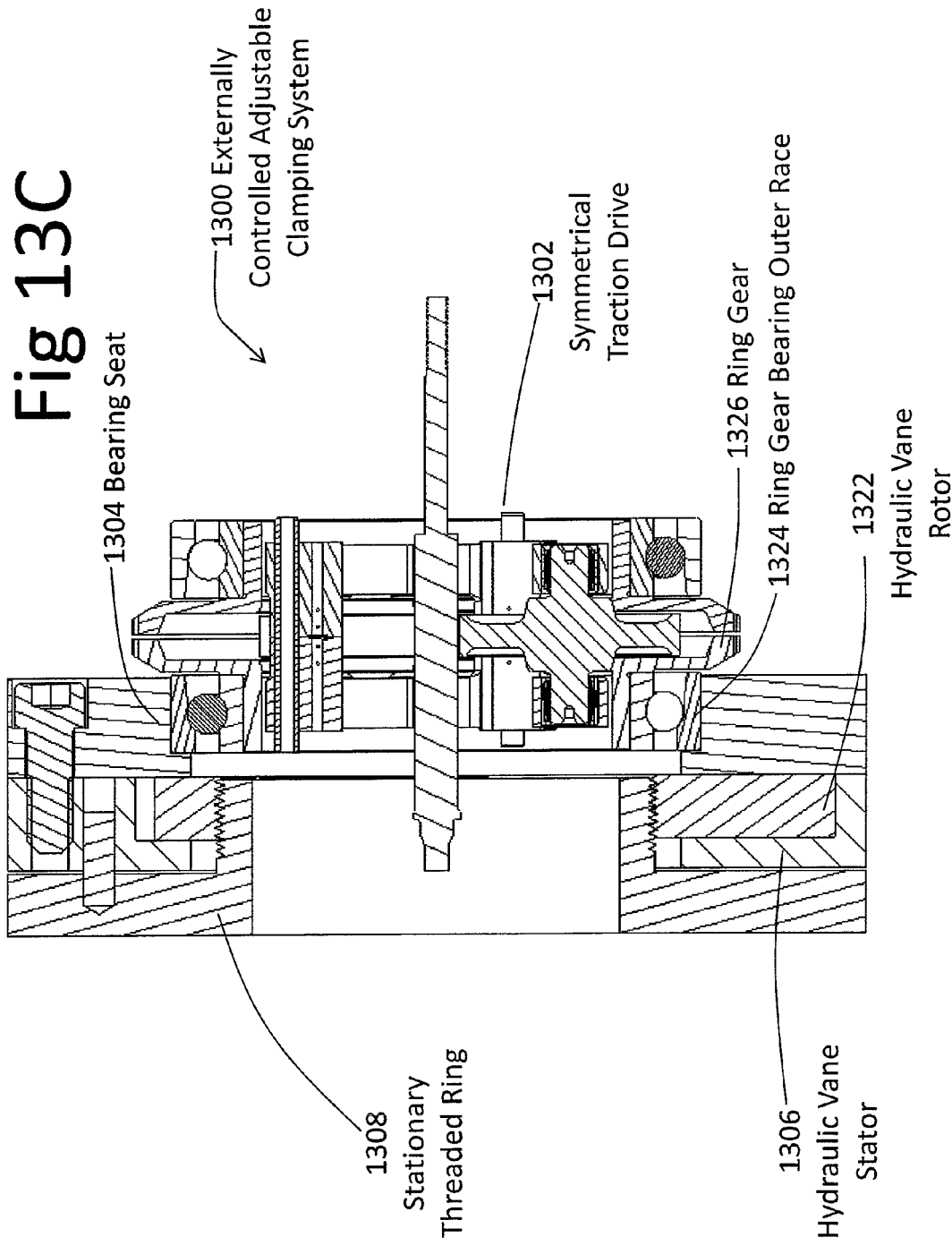

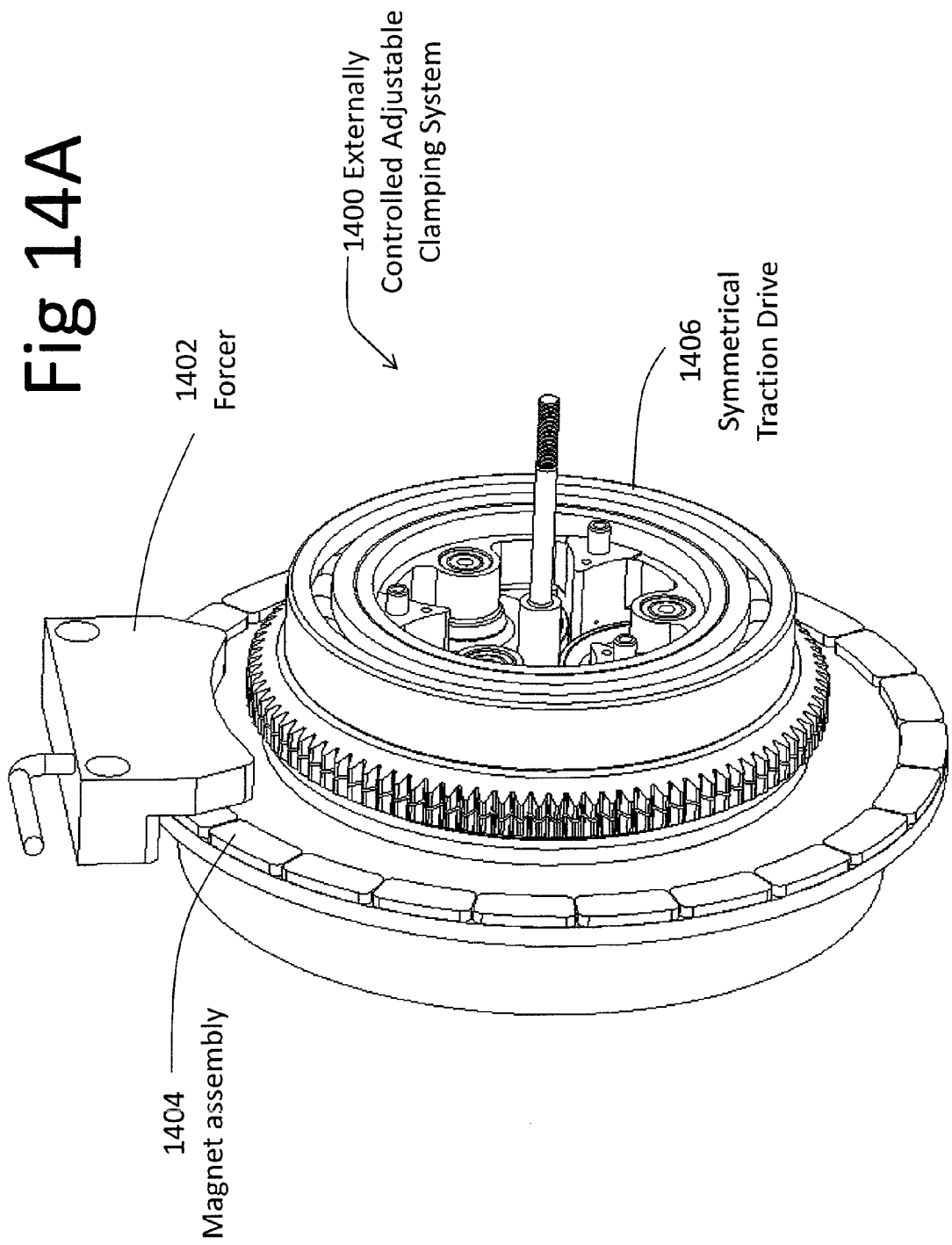

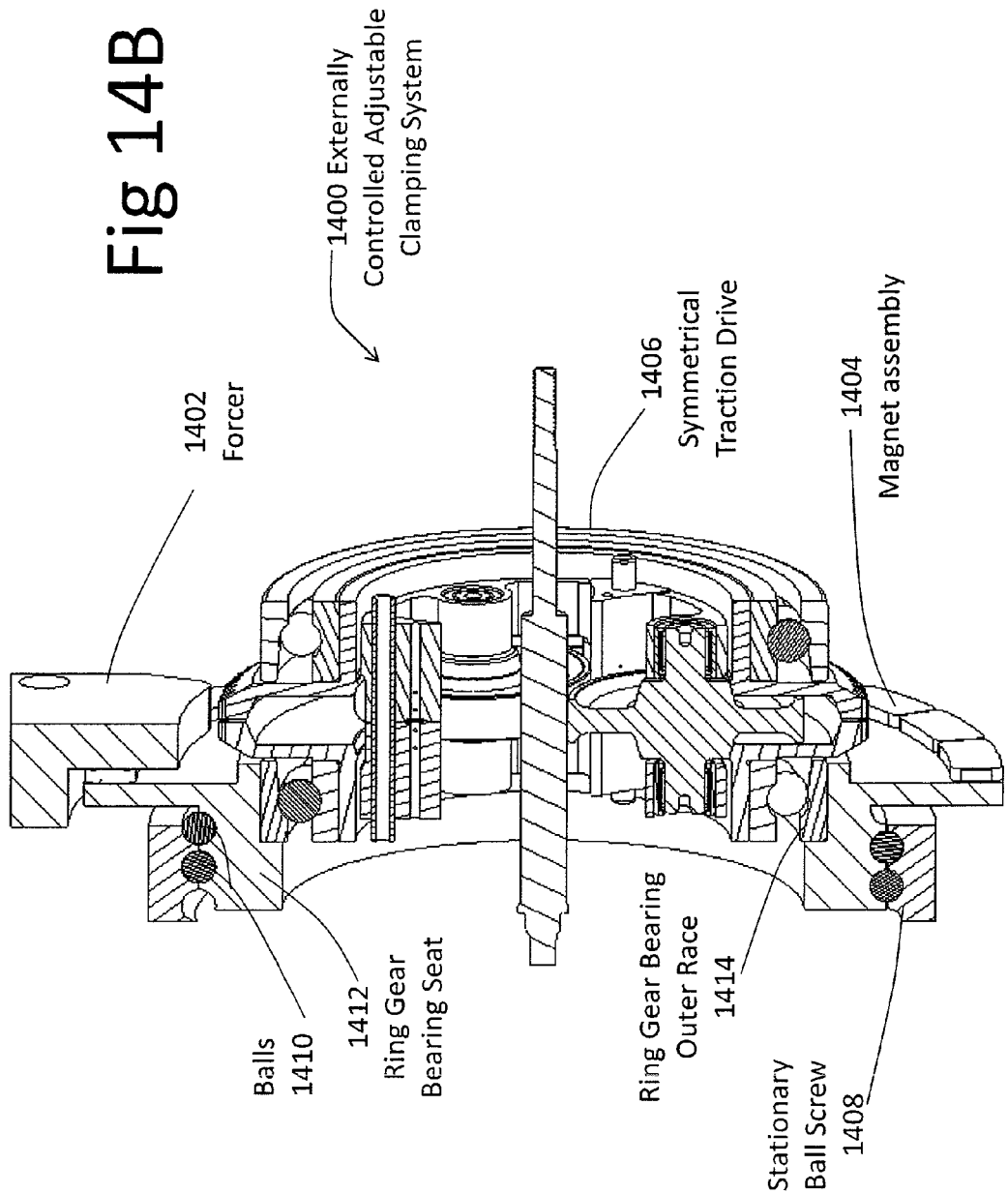

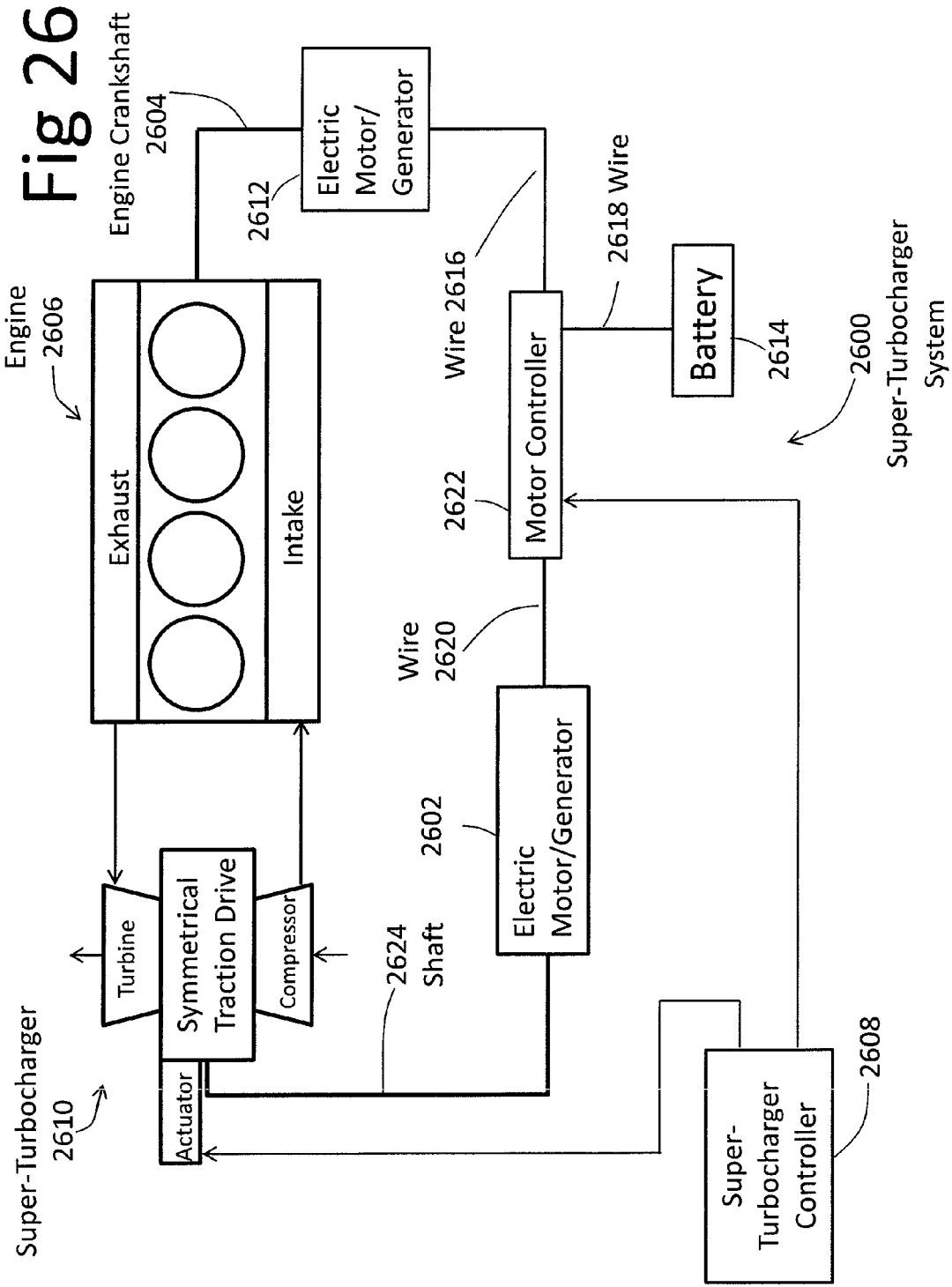

SYMMETRICAL TRACTION DRIVE

CROSS-REFERENCE TO RELATED APPLICATION

The present application is based upon and claims the benefit of Provisional Patent Application No. 61/427,084, entitled "SYMMETRICAL TRACTION DRIVE," and filed Dec. 23, 2010, by Ryan Sherrill, Sterling Holman, Ed Van-Dyne and Wayne Penfold. The entire content of the above-mentioned application is hereby specifically incorporated herein by reference for all it discloses and teaches.

BACKGROUND OF THE INVENTION

Traction drive systems have been used for various purposes and in various environments in the prior art. Typically traction drives are used for CVT applications and for high speed drive systems that operate over 50,000 rpm. Traction drives comprise an alternative to gearing systems and can be used interchangeably with gearing systems in many situations. The advantage of traction drives are the smooth traction surfaces that provide more variability of ratio and the capability for higher speeds than gears. Traction drives use a traction fluid that creates a frictional surface at the traction drive interface to cause adherence between traction surfaces.

SUMMARY OF THE INVENTION

An embodiment of the invention may therefore comprise a method of transferring rotational mechanical energy in a traction drive comprising: obtaining a shaft having a shaft traction surface; obtaining rollers having inner roller traction surfaces and outer roller traction surfaces; mounting the rollers in carriers so that the outer roller traction surfaces of the rollers are disposed to rotationally mate with the shaft traction surface; placing traction rings on opposite sides of the rollers so that traction ring traction surfaces of the traction rings mate with the inner roller traction surfaces of the rollers; forcing the traction rings together to create a force against the inner roller traction surfaces of the rollers and the traction ring traction surfaces of the traction rings that creates a traction interface between the rollers and the traction rings that transfers the rotational mechanical energy between the traction rings and the rollers, and causes the carriers to flex and force the outer roller traction surfaces of the rollers against the shaft traction surface to create pressure on a shaft traction interface that increases friction in the shaft traction interface to transfer the rotational mechanical energy between the shaft and the rollers.

An embodiment of the present invention may further comprise a traction drive comprising: a shaft having a shaft traction surface; rollers having inner roller traction surfaces and outer roller traction surfaces; carriers having flexible sidewalls that hold the rollers so that the outer roller traction surfaces of the rollers are disposed to rotationally mate with the shaft traction surface; traction rings that have sloped ring traction surfaces that mate with the inner roller traction surfaces and create a force against the inner roller traction surfaces that creates a sloped traction interface that transfers rotational mechanical energy between the rollers and the traction rings and causes the flexible sidewalls to flex so that the outer roller traction surfaces of the rollers are forced against the shaft traction surface to create a shaft traction interface that transfers rotational mechanical energy between the rollers and the shaft.

An embodiment of the present invention may further comprise a method of transferring rotational mechanical energy between a high speed device and a low speed device comprising: obtaining a symmetrical traction drive comprising: obtaining a shaft having a shaft traction surface; obtaining rollers having inner roller traction surfaces and outer roller traction surfaces; mounting the rollers in carriers so that the outer roller traction surfaces of the rollers are disposed to rotationally mate with the shaft traction surface to create a shaft traction interface; placing traction rings on opposite sides of the rollers so that traction ring traction surfaces of the traction rings mate with the inner roller traction surfaces of the rollers; forcing the traction rings together to create a force against the inner roller traction surfaces of the rollers and the traction ring traction surfaces of the traction rings that creates a sloped traction interface between the rollers and the traction rings that transfers the rotational mechanical energy between the traction rings and the rollers, and forces the outer roller traction surfaces of the rollers against the shaft traction surface to create pressure on the shaft traction interface that creates friction in the shaft traction interface to transfer the rotational mechanical energy between the shaft and the rollers; coupling a high speed device to the shaft; coupling at least one ring gear to the traction rings; coupling a transfer gear to the at least one ring gear; coupling a low speed device to the transfer gear.

An embodiment of the present invention may further comprise a system for transferring rotational mechanical energy between a high speed device and a low speed device comprising: a symmetrical traction drive comprising: a shaft having a shaft traction surface; rollers having inner roller traction surfaces and outer roller traction surfaces; carriers that hold the rollers so that the outer roller traction surfaces of the rollers are disposed to rotationally mate with the shaft traction surface; traction rings that have sloped ring traction surfaces that mate with the inner roller traction surfaces and create a force against the inner roller traction surfaces that create a sloped traction interface that transfers rotational mechanical energy between the rollers and the traction rings, so that the outer roller traction surfaces of the rollers are forced against the shaft traction surface to create a shaft traction interface that transfers rotational mechanical energy between the rollers and the shaft; a high speed device coupled to the shaft; at least one ring gear coupled to the traction rings; a transfer gear that engages the at least one ring gear; a low speed device coupled to the transfer gear.

BRIEF DESCRIPTION OF THE DRAWINGS

FIG. 7A is an additional sectional view of the symmetrical traction drive of FIGS. 1-5.

FIG. 7B is a schematic diagram of a traction system utilizing a high speed traction device.

FIG. 8 is an illustration of a turbine/compressor system in which a symmetrical drive is disposed to the side of the turbine and compressor.

FIG. 9 is a schematic isometric view of a symmetrical traction drive that is adjusted by a hydraulic motor.

FIG. 10 is a schematic cross-sectional view of the embodiment of FIG. 9.

FIG. 11 is a schematic illustration of another embodiment of an externally controlled adjustable clamping system.

FIG. 12B is an exploded view of the externally controlled adjustable clamping system of FIG. 12A.

FIG. 13C is a cross-sectional view of the externally controlled adjustable clamping system of FIGS. 13A and 13B.

FIG. 14A is a schematic perspective view of another embodiment of an externally controlled adjustable clamping system.

FIG. 14B is a schematic cutaway view of the embodiment of FIG. 14A.

FIG. 26 is a schematic block diagram of an embodiment of a super-turbocharger system.

DETAILED DESCRIPTION OF THE EMBODIMENTS

Figure 1:
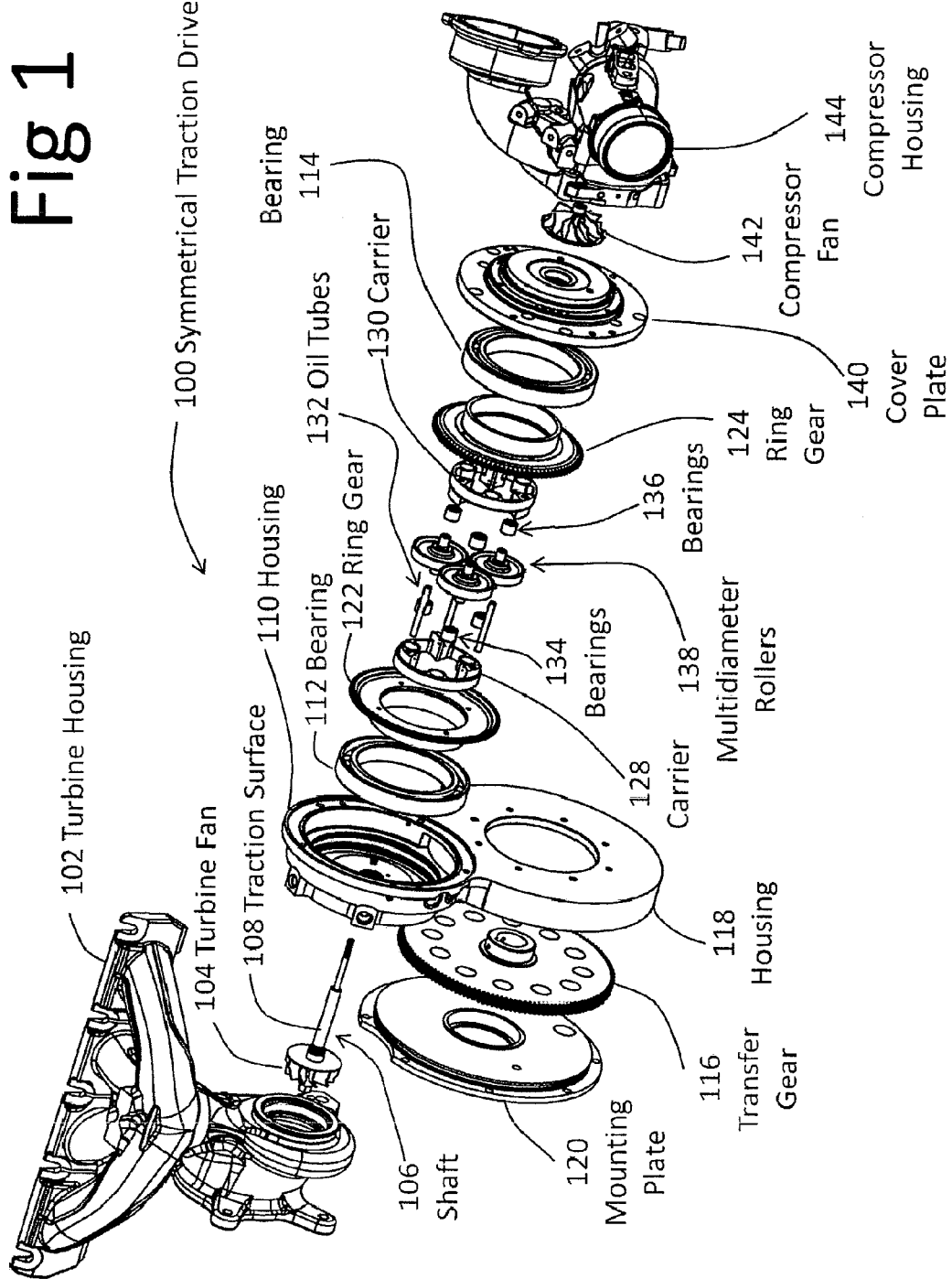
FIG. 1 is an exploded view of one embodiment of a symmetrical traction drive, as may be utilized in a super-turbocharger.

FIG. 1 is an exploded view of a symmetrical traction drive 100 that is deployed in a super-turbocharger system. As illustrated in FIG. 1, a turbine housing 102 is coupled to exhaust manifold of an engine. The turbine housing collects the exhaust gases to drive the turbine fan 104. Turbine fan 104 is connected to a shaft 106 that rotates with turbine fan 104. Shaft 106 is connected on an opposite end to compressor fan 142. Compressor fan 142 is disposed in the compressor housing 144 to create compressed air that is applied to the intake manifold of an engine. Shaft 106 includes a traction surface 108 that interfaces with the outer traction surfaces of multi-diameter rollers 138. Housing 110 is coupled to a cover plate 140, which houses the symmetrical traction drive 100. Housing 118, which is part of housing 110, houses the transfer gear 116 between the housing 118 and the mounting plate 120. Bearings 112, 114 are piloted in housing 110 and cover plate 140, respectively. Housing 110 and cover plate 140 force the bearings 112, 114 inwardly against ring gears 122, 124, respectively. Carriers 128, 130 hold the multi-diameter rollers 138 in the symmetrical traction drive 100 via bearings 134, 136. Oil tubes 132 provide the traction fluid that is sprayed onto the traction surfaces under pressure, as disclosed in more detail below.

Figure 2:
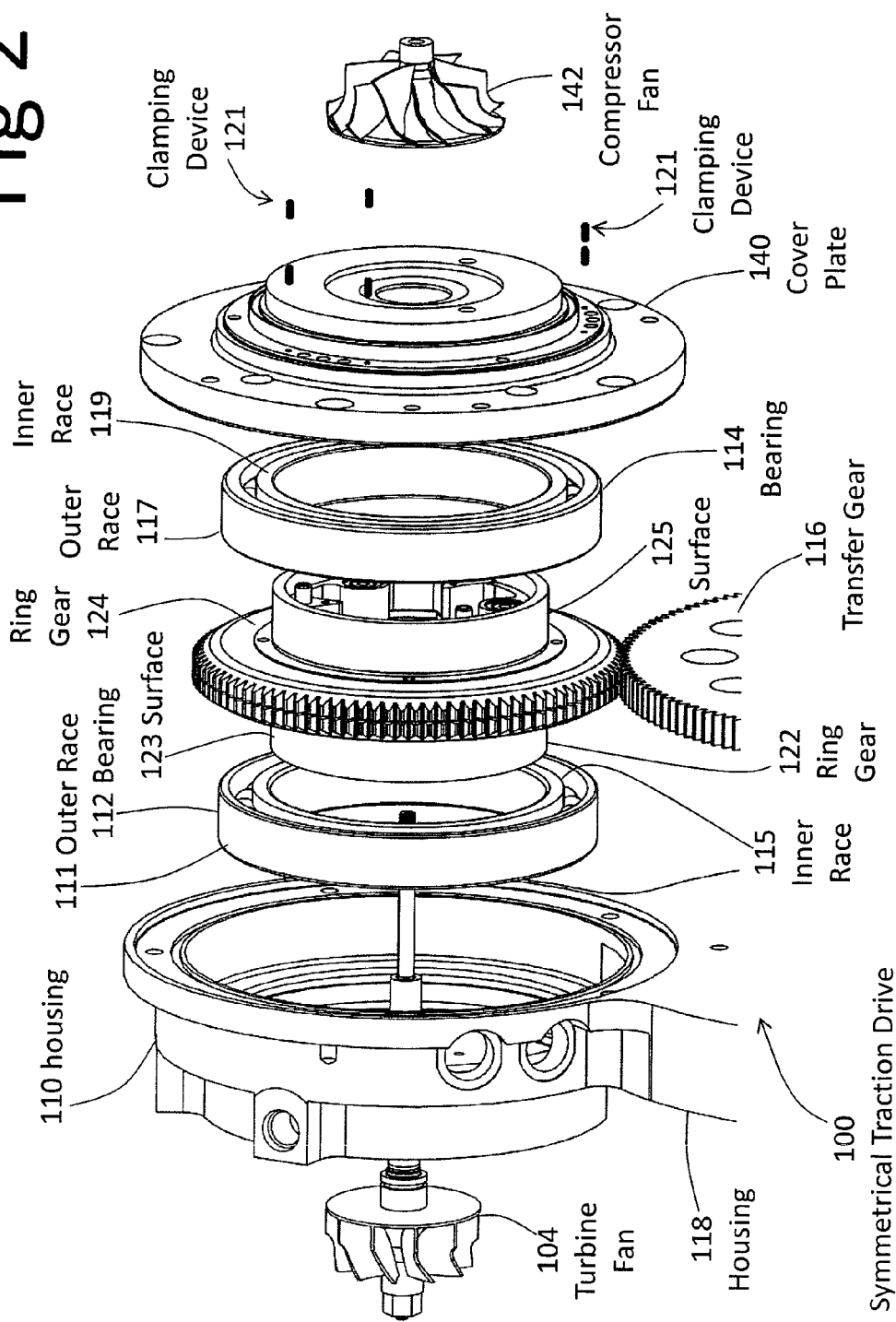
FIG. 2 is an additional exploded diagram of a portion of the symmetrical traction drive illustrated in FIG. 1.

FIG. 2 is a schematic exploded view of a portion of the symmetrical traction drive 100 illustrated in FIG. 1. As shown in FIG. 2, turbine fan 104 is connected to one end of the shaft 106 (FIG. 1). Compressor fan 142 is adapted to be connected to the other end of the shaft 106. The bearing 112 is piloted in the housing 110, so that the outer race 111 of bearing 112 is seated in a holder in the housing 110, allowing the inner race to rotate. Similarly, outer race 117 of bearing 114 is mounted in cover plate 140, so that the outer race 117 of bearing 114 is piloted in a holder in the cover plate 140. Various types of clamping devices, such as set screws 121, can be used to adjust the lateral position of the outer race of bearing 114 and thereby adjust the force that is applied on the ring gears 122, 124 toward each other once cover plate 140 is attached to housing 110. Ring gears 122, 124 are forced together by bearings 112, 114, such that the inner race 115, 119 of bearings 112, 114, respectively, are seated on surfaces 123, 125 of ring gears 122, 124, respectively. Transfer gear 116 is mounted in the housing 118 so that the gears of the transfer gear 116 mate with the gears of ring gears 122, 124.

Figure 21:
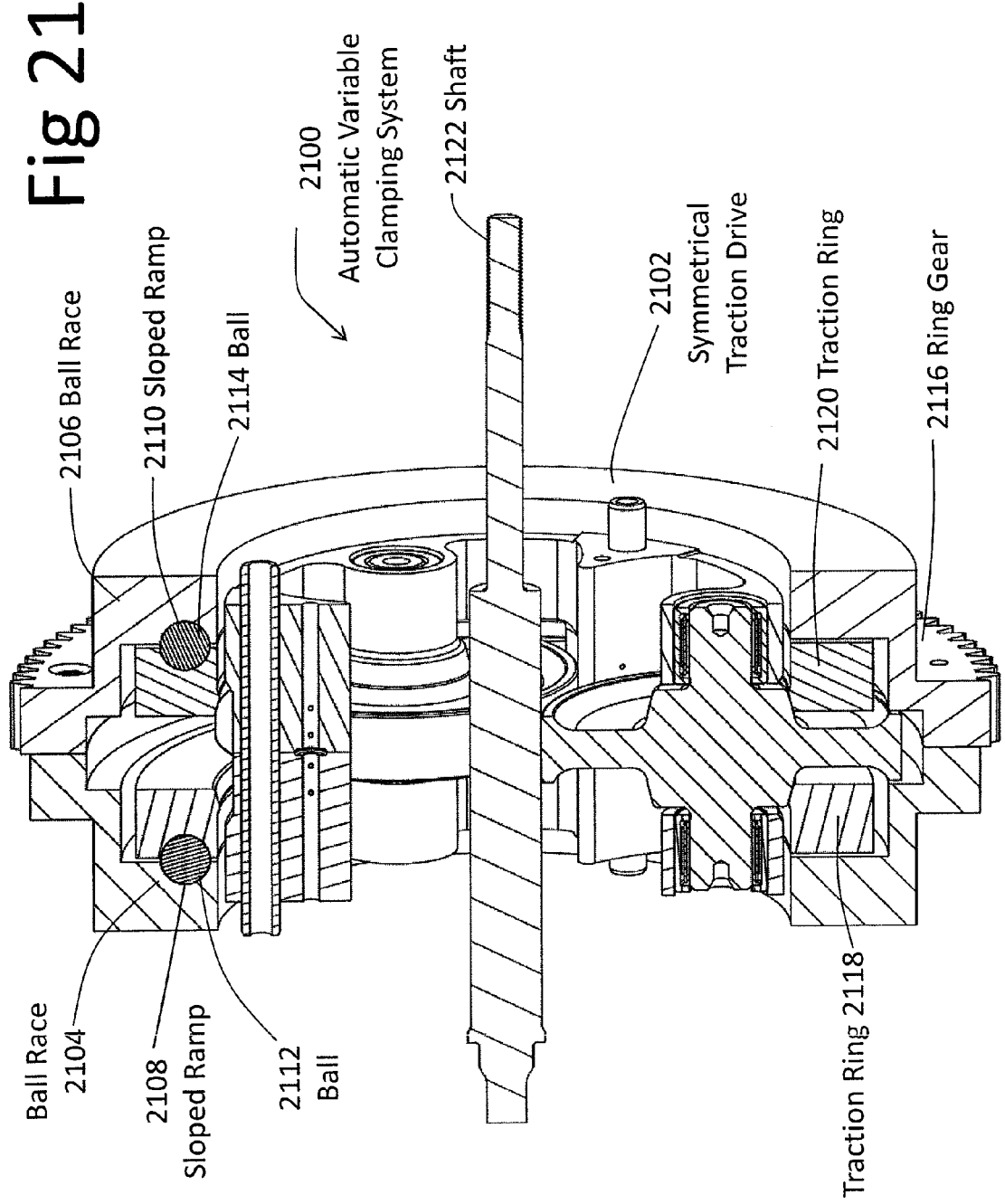
FIG. 21 is a schematic cutaway view of an embodiment of an automatic variable clamping system.

As indicated above, the purpose of the set screws 121 is to function as a clamping device to push the ring gears 122 and 124 closer together. This is achieved in FIG. 2 by asserting a force on the outer race 117 of bearing 114. However, in alternative embodiments, a direct connection between the ring gears 122 and 124, can either increase or decrease the distance between the ring gears 122, 124, to either increase or decrease the clamping force, respectively. Embodiments that utilize these functions are disclosed below. Although set screws 121 are illustrated in FIG. 2 for adjusting the position of the outer race 117 of bearing 114, other devices can be used, which may be either fixed or variable. In that regard, in variable systems, the clamping force can be increased when requested torque increases. Increased clamping force during high torque conditions reduces slippage and prevents damage to the traction surfaces. Conversely, when torque is reduced, the clamping force can be reduced to provide an extended life for the traction surfaces. Further, the variable force clamping systems can operate either automatically or by external control. Automatic systems provide an automatic increase in clamping force when additional torque is applied to the system. Examples of automated variable clamping systems include systems that use ball ramps, ball screws, springs and other automatic variable clamping techniques, which are disclosed in the various embodiments disclosed herein. These types of automatic variable clamping systems are useful in varying the clamping force when smooth transitions of torque occur. However, intermittent changes in torque, such as the pulsing of torque in internal combustion engines, may create excessive wear in these types of automatic variable clamping devices. Externally controlled clamping systems operate by adjusting the clamping force to a desired level, based upon the operating conditions of the devices. Further, although FIG. 1 illustrates ring gears that have traction surfaces, as part of the ring gear structure, separate ring gears can be used, rather than combining a traction surface with the ring gear structure. In other words, separate traction rings can be utilized in conjunction with one or more ring gears, such as illustrated in FIG. 21. For example, FIG. 21 illustrates traction rings 2118, 2120 that are separate from the ring gears 2116. Of course, separate traction rings, such as disclosed in FIG. 21, can be utilized in any of the embodiments disclosed herein. Although the separate traction rings add additional parts, the traction rings can be easily replaced without replacing the entire ring gear if excessive wear occurs.

Figure 25:
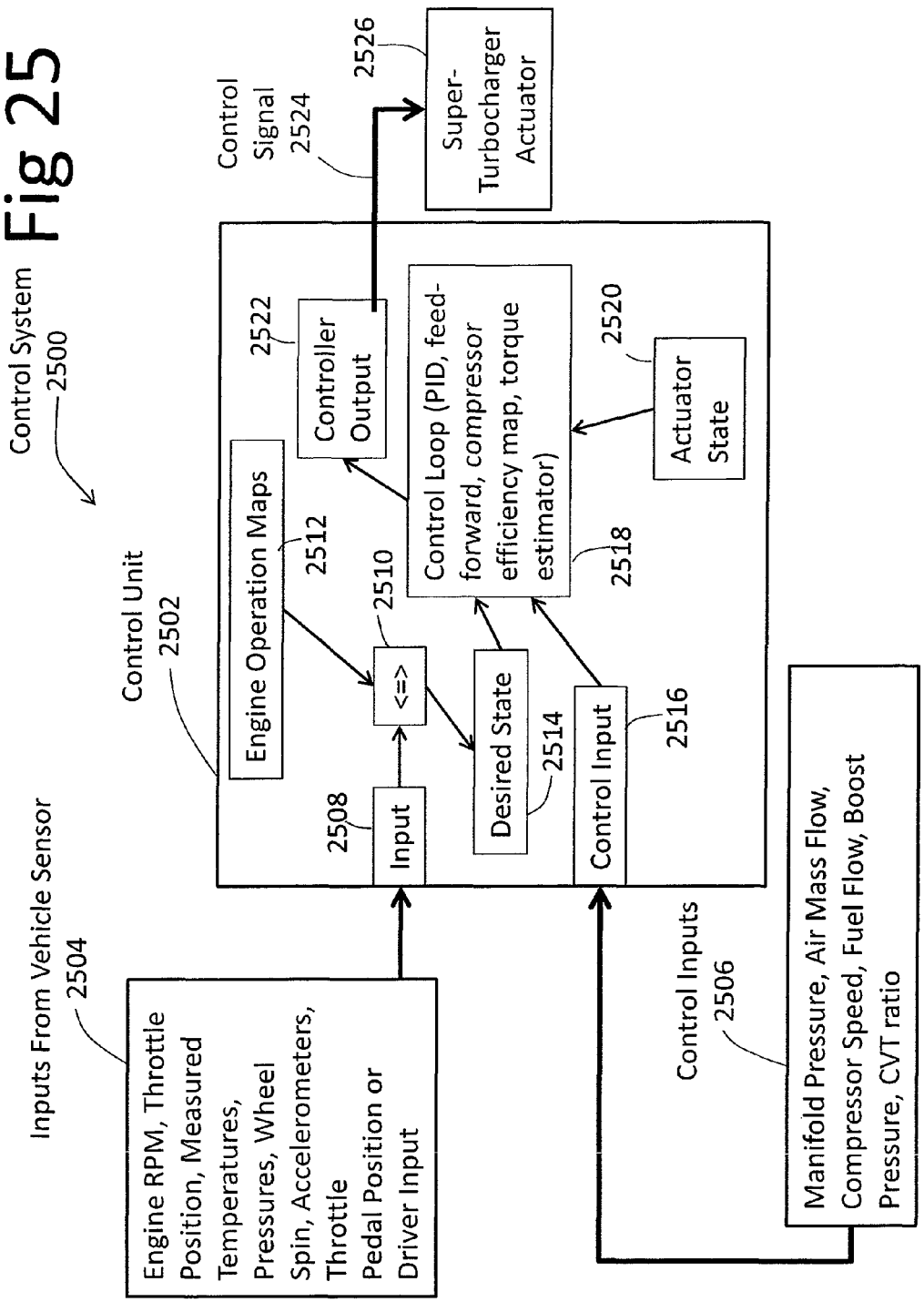
FIG. 25 is a schematic diagram of an embodiment of a control system.

A control unit, such as illustrated in FIG. 25, and U.S. patent application Ser. No. 13/191,407, entitled "Superturbocharger Control Systems," filed Jul. 26, 2011, by Ed VanDyne, Jared William Brown, and Volker Schumacher, which application is specifically incorporated herein by reference for all that it discloses and teaches, is able to detect requested torque and generate a clamping signal on a real time basis. Various embodiments of externally controlled active clamping systems are disclosed herein, which respond to control signals. Each of the embodiments disclosed herein creates clamping forces that are substantially even on the various traction surfaces. In some instances, this requires that the force be applied evenly on the bearings, so that the bearings remain in a parallel disposition. Proper alignment of the traction surfaces balances the forces on the various planet drives, as disclosed below, which ensures even wear and a longer system lifetime.

Figure 3:
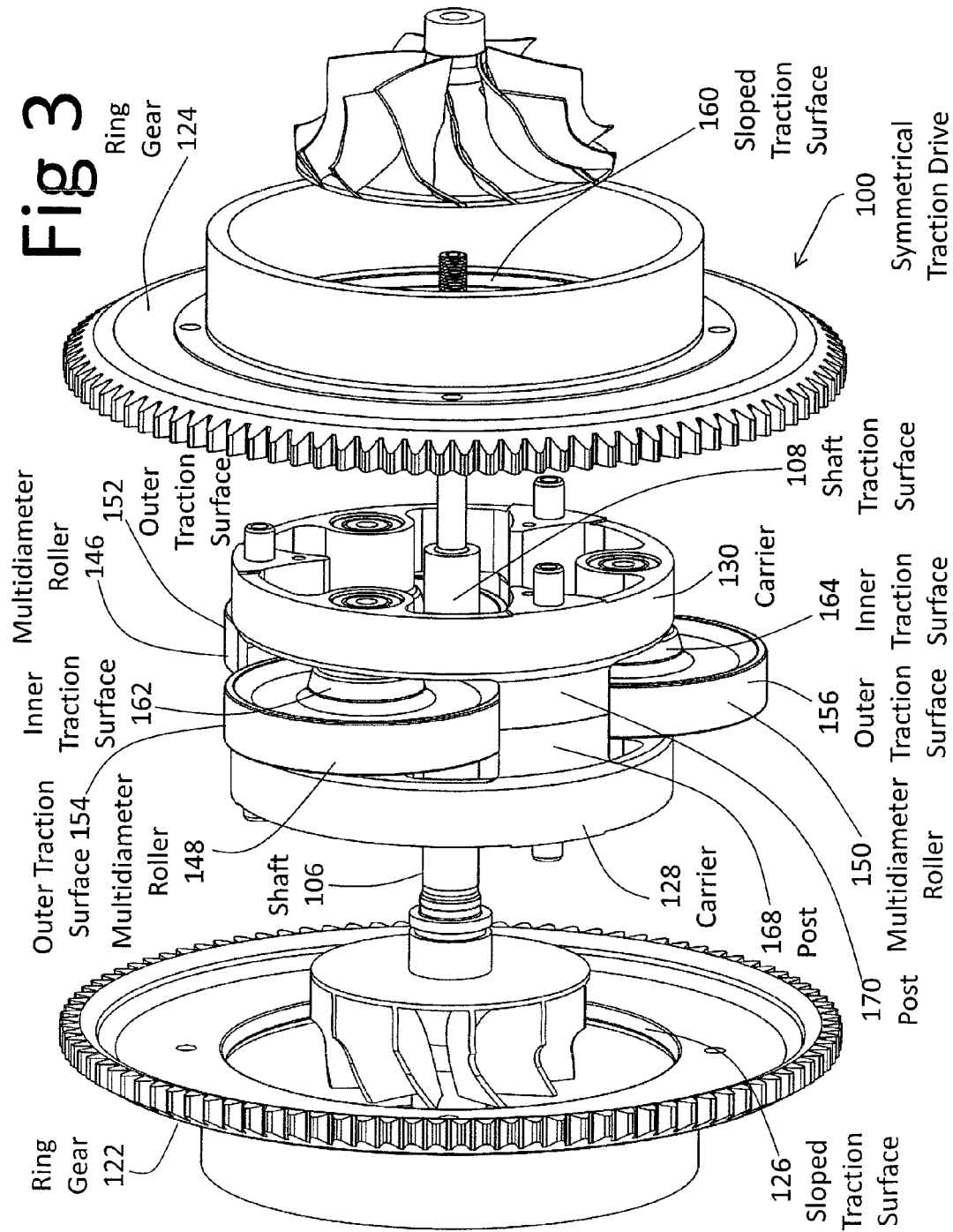
FIG. 3 is another exploded view of a portion of the traction drive illustrated in FIG. 2.

FIG. 3 is an exploded diagram of a portion of the embodiment illustrated in FIG. 2. As shown in FIG. 3, ring gears 122, 124 surround carriers 128, 130. Ring gear 122 has a sloped traction surface 126, which mates with inner traction surfaces on the multi-diameter rollers 146, 148, 150. Similarly, sloped traction surface 160 of ring gear 124 mates with the three inner traction surfaces of multi-diameter rollers 146, 148, 150. For example, sloped traction surface 160 mates with inner traction surface 162 of multi-diameter roller 148, inner traction surface 164 of multi-diameter roller 150, and the inner traction surface 166 (FIG. 4) of multi-diameter roller 146. Similar inner traction surfaces on the opposite side of the multi-diameter rollers 146, 148, 150 mate with sloped traction surface 126 on ring gear 122.

As also illustrated in FIG. 3, multi-diameter rollers 146, 148, 150 have outer traction surfaces 152, 154, 156, respectively. The outer traction surfaces 152, 154, 156 interface with shaft traction surface 108 on shaft 106. As can be seen from FIG. 3, the outer traction surfaces 152, 154, 156 are wide and provide a large surface area for interfacing with the shaft traction surface of the shaft 106. In this manner, a significant amount of torque can be transferred between the shaft 106 and the multi-diameter rollers 146, 148, 150. Carriers 128, 130 have posts, such as posts 168, 170, respectively, that join the carriers 128, 130 together and provide a stable structure for the carriers 128, 130. Two additional sets of posts are disposed between the multi-diameter rollers 146, 148, 150. The posts, such as posts 168, 170, have a curved triangular shape so as to maximize the structural integrity of the posts and provide a stable structure for the carriers 128, 130, which hold the multi-diameter rollers 146, 148, 150 in a stable manner.

Figure 4:
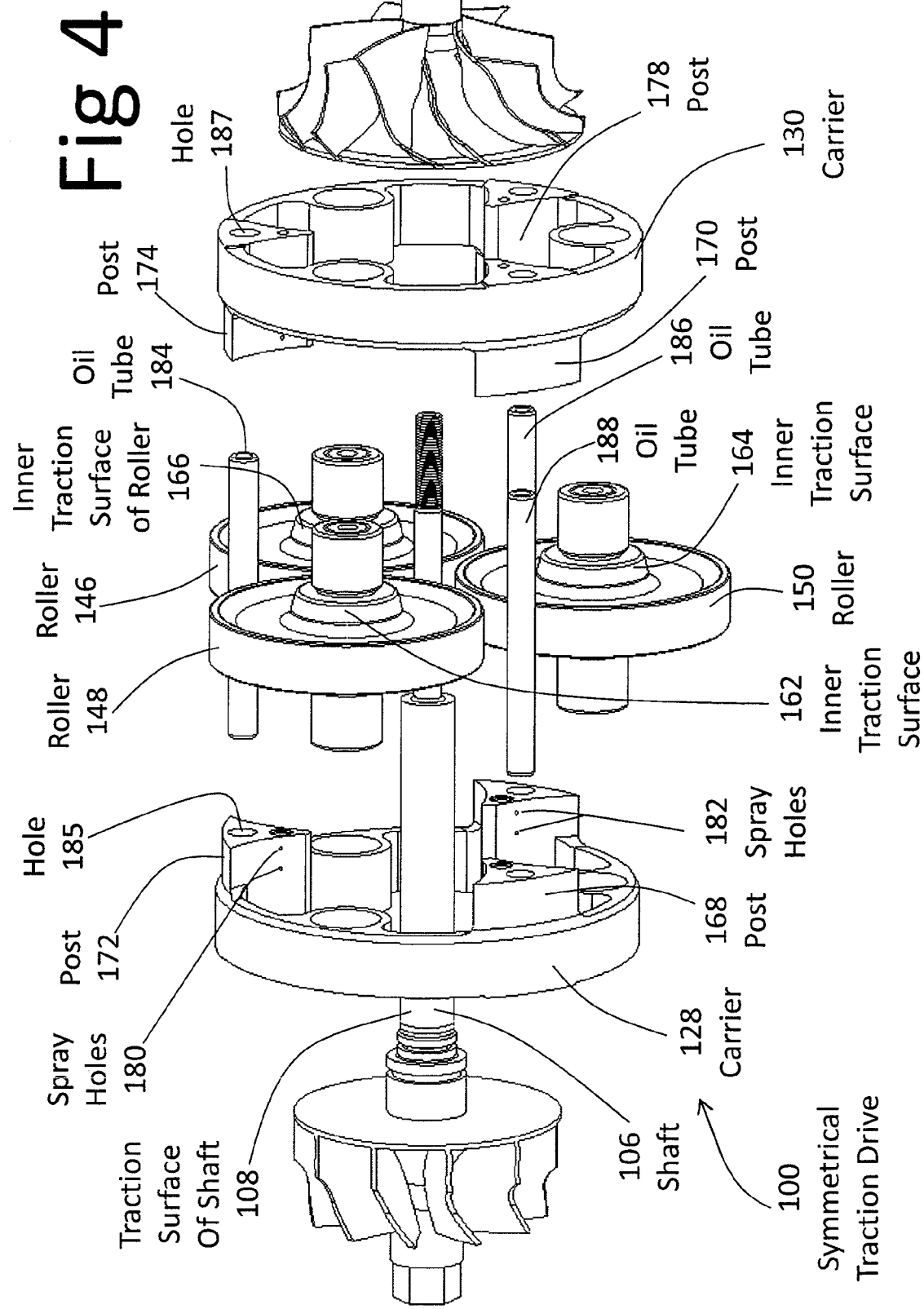
FIG. 4 is another illustration of a portion of the traction drive illustrated in FIG. 3.

FIG. 4 is an additional exploded view of a portion of the embodiment of FIG. 3. FIG. 4 illustrates the carriers 128, 130 separated from one another and the manner in which the multi-diameter rollers 146, 148, 150 are mounted in carriers 128, 130. FIG. 4 also illustrates the manner in which the shaft 106 is inserted between the multi-diameter rollers 146, 148, 150. The oil tubes 184, 186, 188 function to pin together the carriers 128, 130. Each of the oil tubes 184, 186, 188 pilot in the holes of the posts of the carriers and in the housing 110 (FIG. 1) to hold the carriers 128, 130 together and cover plate 140 (FIG. 1). Traction fluid is inserted through the oil tubes 184, 186, 188 under pressure. Openings in the oil tubes 184, 186, 188 provide the traction fluid, under pressure, to spray holes in the posts 168, 170, 172, 174, 176, 178. For example, oil tube 184 is inserted through holes 185, 187 and provides traction fluid under pressure, which is sprayed from spray holes 180. Spray holes are included on both sides of the posts 168-174, such as spray holes 182, so that traction fluid is sprayed on both the closing and opening sides of the traction interface of the shaft traction surface 158 of shaft 106 and outer traction surfaces 152, 154, 156 (FIG. 3) of multi-diameter rollers 146, 148, 150. Traction fluid is sprayed from the spray holes in the posts on the closing side of the traction interface, i.e., the portion of the traction interface in which the traction surfaces are rolling together, to ensure that traction fluid is present in the interface of the traction surfaces, so as to create friction in the traction interface between the traction surfaces and prevent slipping of the traction surfaces. Traction fluid is sprayed on the opening portion of the traction interface and impinges upon the traction surfaces to cool the traction surfaces. In this manner, both traction and cooling are accomplished by spraying traction fluid on the closing and opening portions of the interface, respectively.

Figure 5:
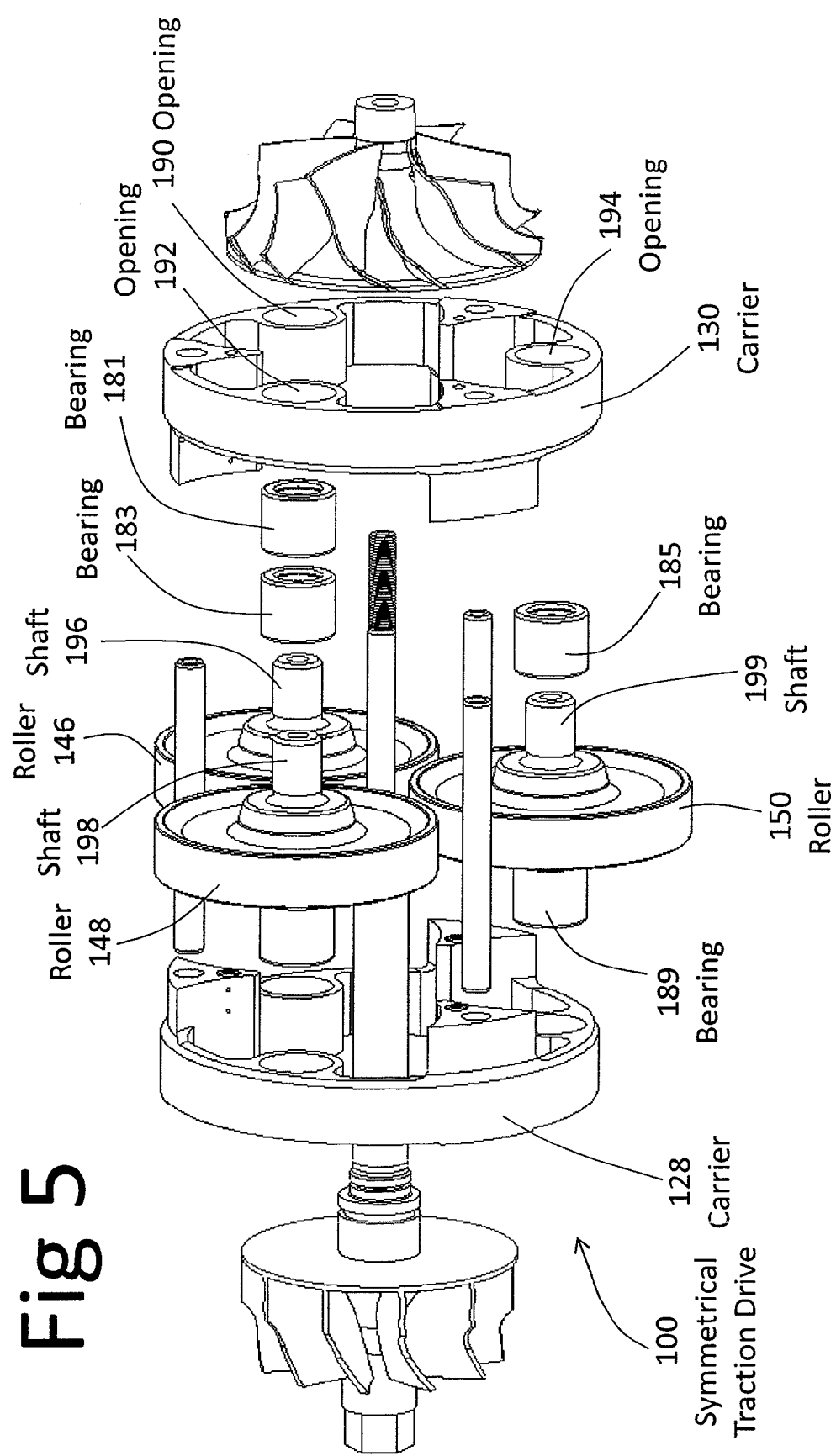
FIG. 5 is another exploded view of a portion of the traction drive illustrated in FIG. 4.

FIG. 5 is another exploded view illustrating portions of the embodiment of FIG. 4. As shown in FIG. 5, bearings 136 (FIG. 1), which comprise individual bearings 181, 183, 185 are mounted on shafts 196, 198, 199, respectively. Bearings 181, 183, 185 allows shafts 196, 198, 199 to rotate around the axes of the shaft 196, 198, 199. Bearings 181, 183, 185 are mounted in openings 190, 192, 194, respectively, so that the multi-diameter rollers 146, 148, 150 can rotate with respect to carrier 130. In addition, bearings 181, 183, 185, as well as the bearings 134 (FIG. 1) on the other side of the shafts 196, 198, 199 allow the multi-diameter rollers 146, 148, 150 to translate horizontally, as shown in FIG. 5, so that the multi-diameter rollers 146, 148, 150 are aligned with the ring gears 122, 124 when the ring gears 122, 124 are assembled over the carriers 128, 130. In addition, the forces on the inner traction surfaces which are located on opposite sides of the multi-diameter rollers 146, 148, 150 that engage the sloped traction surfaces 126, 160 (FIG. 3) on ring gears 122, 124 (FIG. 3), respectively, are substantially symmetrical forces which substantially balance the forces that are applied to multi-diameter rollers 146, 148, 150. Since the traction drive illustrated in FIGS. 1-5 operates at high rotational speeds, the application of balances forces creates a stable structure which is capable of operating at high rotational speeds in a stable manner.

In addition, the design illustrated in the embodiment of FIGS. 1-5 provides a substantial change in rotational speed between shaft 106 and ring gears 122, 124 without the use of gears. For example, the difference in the diameter of the inner traction surface of the rollers to the outer traction surface, such as inner traction surface 162 to outer traction surface 154, of multi-diameter roller 148, as shown in FIG. 3, provides a first speed modification ratio. The second speed ratio is provided by the difference in the radius of the outer traction surface of the rollers, such as outer traction surface 154 of multi-diameter roller 148, to the radius of the shaft traction surface 108 of shaft 106. These two differences are cumulative and can provide speed ratios of 20:1 or more. Speed ratios of 20:1 or more are significant when the traction drive device 100 illustrated in FIGS. 1-5 operates at rotational speeds of 100,000 to 500,000 RPM. In that regard, high RPM systems of 50,000 RPM and greater that use gears have a limited life span. Traction drive systems work effectively and have a much longer life span in such high RPM systems. Since even the best gears cannot operate over approximately 100,000 RPM, the embodiment of the traction drive illustrated in FIGS. 1-5 is capable of reducing the rotational speeds by a factor of approximately 20×, which reduces the rotational speeds to 5,000 to 25,000 RPM, which can easily be handled by gearing systems. These numbers are exemplary only and may vary in accordance with the particular implementation of the embodiment of the traction drive illustrated in FIGS. 1-5, as well as other embodiments using the principles illustrated in the embodiment of FIGS. 1-5.

Figure 6:
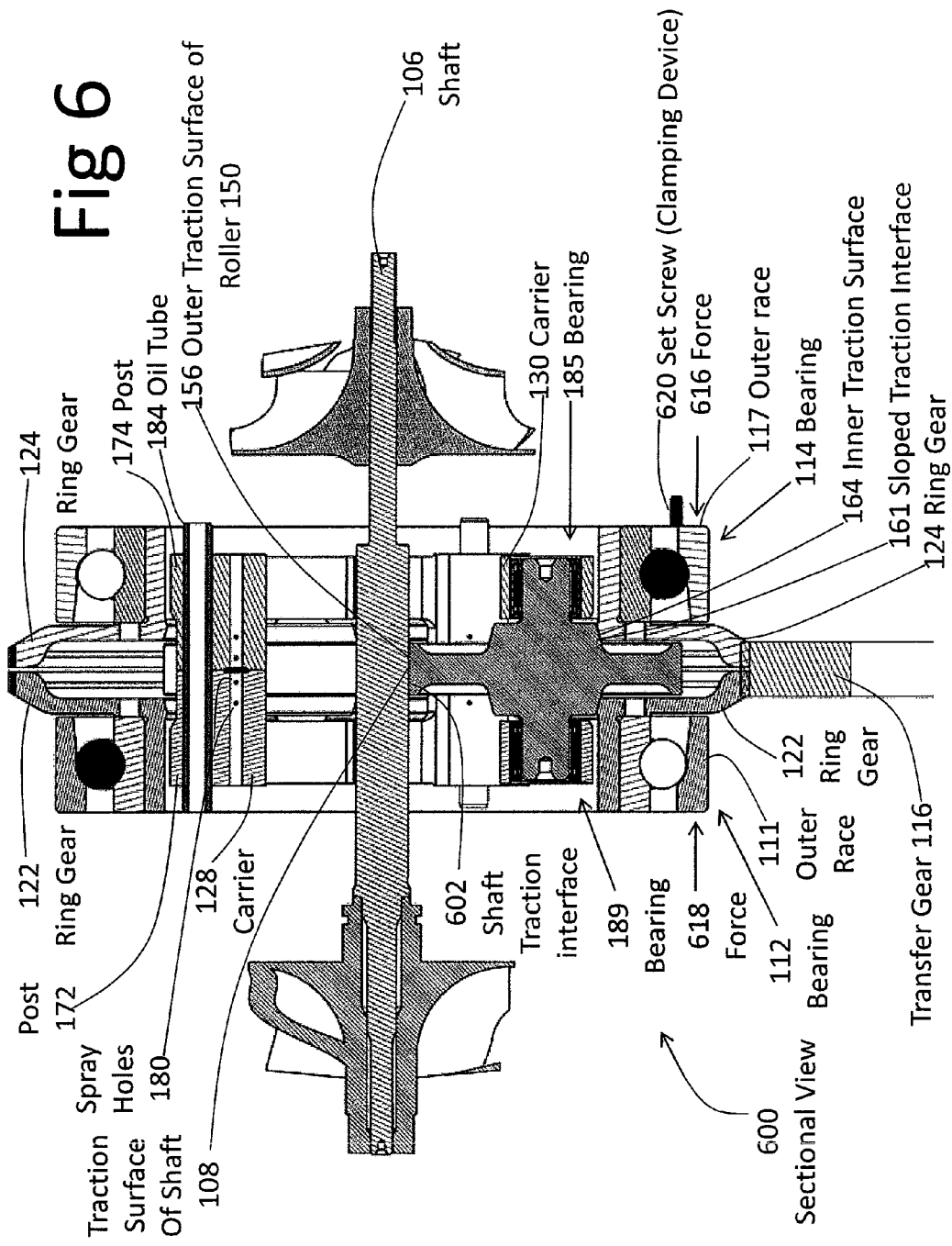
FIG. 6 is a sectional view of the embodiment of the traction drive illustrated in FIGS. 1-5.

FIG. 6 is a schematic cross-sectional view taken vertically through the center of the embodiments illustrated in FIGS. 1-5. As shown in FIG. 6, the cross-sectional view shows a section that passes substantially through the middle of multi-diameter roller 150. Multi-diameter roller 150 is held by bearings 185, 189, which allow the multi-diameter roller 150 to rotate with respect to carriers 128, 130. Ring gear 124 is forced inwardly by bearing 114. Clamping devices, such as set screws 121 (FIG. 2), or set screw 620, or other clamping devices, such as disclosed herein, create a force on the outer race 117 of bearing 114, to create the inward force on the ring gear 124. As noted above, the outer race 111 of bearing 112 is piloted in the housing 110, illustrated in FIG. 1. As such, a reactive force 616 is created on bearings 112, in response to force 616 on bearing 114. Forces 616, 618 are transferred to the ring gears 122, 124 through bearings 114, 112, respectively. As such, the inner traction surface 164 of multi-diameter roller 150 is forced inwardly and against sloped traction surface 160 of ring gear 124. Since the sloped traction interface 161 between the sloped traction surface 160 of ring gear 124 and the inner traction surface 164 of multi-diameter roller 150 is slanted, the multi-diameter roller 150 is forced toward the shaft 106 to create the shaft traction interface 602 between shaft traction surface 108 of the shaft 106 and the outer traction surface 156 of roller 150. Of course, the forces on the rollers are balanced because the sloped traction surface 126 creates substantially the same forces on the inner traction surfaces on the outer side of the multi-diameter rollers 146, 148, 150. It has been empirically determined that slopes of approximately 1 degree to 20 degrees creates a good traction interface, provides good leverage for forcing the rollers toward the shaft and reduces parasitic losses in bearings 112, 114. At the lower angles, more movement is required to create a greater force, which provides greater resolution in the ability to adjust the force to the desired level. In addition, there may be less slippage across the face of the traction surface at lower degrees/angles, and therefore lower parasitic losses. However, when using devices that do not create a large lateral translative movement, such as piezoelectric devices, a greater slope is required because these devices are limited as to the distance that can be achieved. Accordingly, the lateral translative movement describes the movement created by the actuator along the zero degree direction, which is the horizontal direction in the cross-sectional diagrams. Additionally, lateral translation has also been described with respect to the rollers, which adjust to the forces applied on a single side. The rollers move in a lateral direction along the zero degree direction, which is the horizontal direction illustrated in the cross-sectional diagrams, so that the inner wheel traction surfaces are evenly balanced. A slope of approximately 10 degrees creates leverage between the sloped traction surfaces 126, 160 and the inner traction surfaces of the multi-diameter rollers 146, 148, 150 that substantially prevents slippage and creates an effective traction interface between the ring gears and the multi-diameter rollers and reduces parasitic losses in bearing 112, 114 since less translational force must be provided to create a sufficient traction force on traction interface 602 and the other interfaces of shaft traction surfaces and other traction surfaces of the rollers. The traction surfaces disclosed herein are smooth, ground surfaces that are typically made from hardened steel, but may comprise other suitable traction surfaces known to those skilled in the art of traction surfaces. FIG. 6 also illustrates oil tube 184 that extends through posts 172, 174. The oil tube 184 provides traction fluid to spray holes 180 disposed in posts 172, 174. As indicated above, additional spray holes are included that spray traction fluid on both shaft traction interface 602 and sloped traction interface 161.

FIG. 7A is an additional sectional view 600 of the symmetrical traction drive 100. As shown in FIG. 7A, the symmetrical traction drive 100 is not coupled to either a compressor or a turbine. Shaft 106 may be coupled to any desired device. Ring gears 122, 124 are coupled to a transfer gear 116. Transfer gear 116 may also be utilized in any desired manner.

FIG. 7B is a schematic diagram of a traction system 700 utilizing the high speed traction device 706. As illustrated in FIG. 7B, the high speed traction device 706 is coupled to a high speed device 702 via shaft 704. The high speed traction device 706 may comprise the symmetrical traction drive 100 illustrated in FIGS. 1 through 7A, or other embodiments of a symmetrical traction drive that are disclosed herein. Ring gears 718 are coupled to a transfer gear 708. Transfer gear 708 has shaft 710 that is coupled to an optional transmission 712. The optional transmission 712 has a shaft 714 that is coupled to a low speed device 716. Of course, the optional transmission 712 can be eliminated, so that shaft 710 is coupled directly to the low speed device 716. The optional transmission 712 can be a fixed ratio transmission, or a variable ratio transmission. For example, some systems have a narrow operating band, such as generators. A fixed ratio transmission can be used for those types of systems. However, for many other systems, a wide band of operating points is necessary, which results in a necessity to use a variable ratio transmission. Variable ratio transmissions may comprise continuously variable transmissions, infinitely variable transmissions, or multiple ratio transmissions with discreet gear sets. The ratio adjusting transmission may include fixed gears, mechanical CVTs, speed summing CVTs with variators, including hydraulics, pneumatics, electric motors and mechanical variators. Discreet gear transmissions, with the ability to shift between gears can also be used, such as automatic transmissions and dual clutch transmissions.

As shown in FIG. 7B, power and torque can be transmitted in either direction. For example, power and torque may be provided by the high speed device 702 to the low speed device 716. Alternatively, low speed device 716 may generate torque that is applied to the high speed device 702. The utilization of the high speed traction device 706 simply allows conversion of high speed rotational mechanical energy to low speed rotational mechanical energy and vice versa. The high speed device 702 may comprise numerous different devices. For example, the high speed device 702 may be a device that either drives, or is driven by, the low speed device 716. The high speed device can comprise a turbine. Examples of turbines include exhaust turbines, steam turbines, including the Tesla turbine and the Schumacher turbine, compressors, combinations of turbines and compressors, high speed pumps, dentist drills, or other devices that operate with high rotational speed and mechanical energy. The low speed device 716 may comprise all types of electric motors, generators, hydraulic pumps, piston engines, or any other type of motive device. For example, high speed device 702 may be a high speed pump that is driven by a low speed device, such as a motor or engine. Similarly, low speed device 716 may comprise a lower speed pump that is driven by a higher speed device 702. High speed device 702 may comprise a compressor, while low speed device 716 may comprise an engine that drives the high speed compressor 702. The high speed device 702 may comprise a turbine, which drives an engine, a generator, or an electric motor. The high speed device 702 may comprise a steam turbine, which can drive a generator or an electric motor as a low speed device 716. For example, various high efficiency steam turbines can be used to efficiently drive generators or electric motors. One example of a high efficiency steam turbine is a Tesla steam turbine. The high speed device 702 can also be a high speed dentist drill that is driven by a lower speed electric motor, as low speed device 716. Clearly, there are many applications for the traction system illustrated in FIG. 7B, in which a transfer in rotational mechanical energy can be accomplished between a high rotational speed and a low rotational speed.

FIG. 8 is an illustration of a turbine/compressor system 800 in which a symmetrical drive 818 is disposed to the side of the turbine 802 and compressor 812. As illustrated in FIG. 8, turbine 802 receives exhaust gases 804, which drives the turbine 802. Exhaust gases 806 then exit the turbine 802. Shaft 810 connects the turbine 802 with the compressor 812. Air intake 816 allows air to flow into the compressor 812 to create compressed air 814. Shaft 820 connects the compressor 812 to the symmetrical drive 818. Hence, the symmetrical drive 818 is placed to the side of the turbine 802 and compressor 812. Turbine 802 is placed on the far side, away from the traction drive, since the exhaust gases are exhausted from the side of the turbine 802. Accordingly, there is no necessity for locating the symmetrical drive 818 between the turbine 802 and compressor 812, as disclosed in various embodiments herein.

FIG. 9 is a schematic isometric view of an externally controlled adjustable clamping system 900 that is adjusted by a hydraulic motor 902. As illustrated in FIG. 9, the hydraulic motor 902 activates a gear 904 to drive the adjustment gear 908. Adjustment gear 908 is coupled to the threaded adjustment ring 910, which has interior threads 914. Ring gears 912 rotate independently of the adjustment gear 908 and threaded adjustment ring 910. Rotation of the threaded adjustment ring 910 causes the threaded adjustment ring 910 to generate clamping forces on the symmetrical traction drive 906. Hydraulic motor 902 may be operated in response to a controller, such as the control unit illustrated in FIG. 25, to rotate gear 904, which, in turn, rotates adjustment gear 908, which either tightens or loosens the threaded adjustment ring 910 on the symmetrical traction drive 906.

FIG. 10 is a schematic cross-sectional view of the embodiment of FIG. 9. As illustrated in FIG. 10, the hydraulic motor 902 can be activated to drive the gear 904, which meshes with and drives the gear teeth on adjustment gear 908. Gear 904 causes the adjustment gear 908 to rotate. Adjustment gear 908 is coupled to, and forms a part of, ring gear bearing seat 918. Adjustment gear 908 and ring gear bearing seat 918 can be formed as a single part, as disclosed in FIG. 10, or as separate parts that are coupled together. The same is true for the other embodiments disclosed herein. Bearing 923 isolates the ring gear bearing seat 918 from the symmetrical traction drive 900. As the ring gear bearing seat 918 rotates, threads 916 of the ring gear bearing seat 918 engage threads 914 of the threaded adjustment ring 910. The threaded adjustment ring 910 is fixed to a housing (not shown) and does not rotate. Likewise, the symmetrical traction drive 900 is fixed on the other side by housing 922. As the ring gear bearing seat 918 is rotated, the ring gear bearing seat 918 moves laterally with respect to the fixed threaded adjustment ring 910. As such, the ring gear bearing seat 918 moves laterally and either applies pressure to the ring gear bearing outer race 920, or reduces the force on the ring gear bearing outer race 920. By applying pressure to the ring gear bearing outer race 920, force is applied by bearing 923 to the ring gear 924. Ring gear 926 reacts to the force applied by bearing 923 and a reactive force is created by bearing 928, so that equal and opposite forces are created by the ring gears 924, 926.

FIG. 11 is a schematic illustration of an externally controlled adjustable clamping system 1100 that is similar to the externally controlled adjustable clamping system 900, illustrated in FIGS. 9 and 10, with the exception that a hydraulic motor, such as hydraulic motor 902 (FIG. 9), is replaced with other devices for driving gear 1110. For example, the externally driven motor can be a pneumatic motor, which can operate from the pneumatic sources available from an engine. In addition, electric motors, such as AC motors, DC motors, stepper motors, induction motors, and other types of electric motors, can be used to drive gear 1110. Virtually any type of motor 1102 can be used as the motive force, including internal combustion motors, steam motors, thermal electric motors, repulsion motors, ultrasonic motors, etc. As shown in FIG. 11, the externally controlled motor 1102 operates gear 1110 to rotate the adjustment gear 1106 and the ring gear bearing seat 1112, which adjusts the position of the ring gear bearing seat 1112 with respect to the threaded adjustment ring 1108, which is fixed. Although the various motive devices 1102 have been shown, in FIG. 11 with respect to a particular embodiment of the externally controlled adjustable clamping system 11, any of the embodiments which allow for externally controlled adjustable clamping can employ the various motive devices disclosed herein, and those known to those skilled in the art.

Figure 12A:
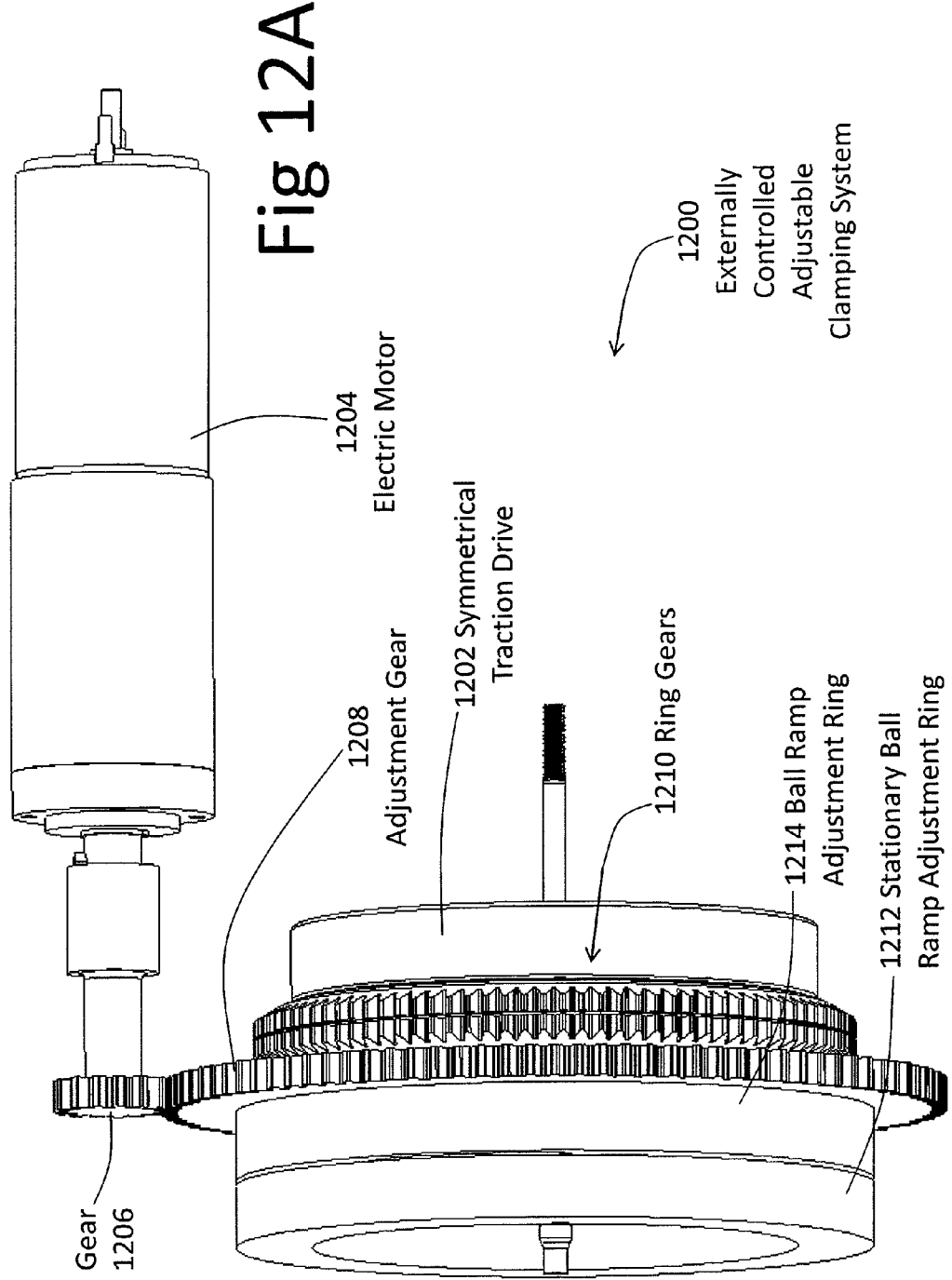
FIG. 12A is a schematic illustration of another embodiment of an externally controlled adjustable clamping system.

FIG. 12A is a schematic illustration of another embodiment of an externally controlled adjustable clamping system 1200. As shown in FIG. 12A, symmetrical traction drive 1202 is adjusted by an electric motor 1204. Electric motor 1204, in at least one embodiment, may comprise a high powered stepper motor that provides a very precise adjustment by stepping the rotational position of the shaft of the motor. Electric motor 1204 is connected to gear 1206. Gear 1206 actuates adjustment gear 1208. Stationary ball ramp adjustment ring 1212 is coupled to a housing (not shown) and does not move. Adjustment gear 1208 is coupled to an ball ramp adjustment ring 1214 that rotates in response to movement of the adjustment gear 1208. Ring gears 1210 of the symmetrical traction drive 1202 rotate independently of the adjustment gear 1208, stationary ramp adjustment ring 1212 and ball ramp adjustment ring 1214.

FIG. 12B is an exploded view of the externally controlled adjustable clamping system 1200 illustrated in FIG. 12A. As shown in FIG. 12B, ball 1218 sits in a sloped ramp 1216 on the ball ramp adjustment ring 1214. Similarly, ball 1220 sits in sloped ramp 1222 of the adjustable ball ramp adjustment ring 1214. Stationary ball ramp adjustment ring 1212 is disposed against the adjustable ball ramp adjustment ring 1214. When adjustment gear 1208 is rotated, the ball ramp adjustment ring 1214 rotates, and balls 1218, 1220 move in sloped ramps 1216, 1222, respectively. Since the stationary ball ramp adjustment ring 1212 is fixed on a housing, and does not move, the adjustable ball ramp adjustment ring 1214 moves laterally to adjust the force on ring gears 1210. In this manner, the force on the ring gears 1210 can be adjusted using controls for the electric motor 1204. Although an electric motor 1204 is disclosed as the motive device in FIG. 12B, any of the other devices described herein can be used as the motive force for the actuator for the ball ramp.

Figure 13A:
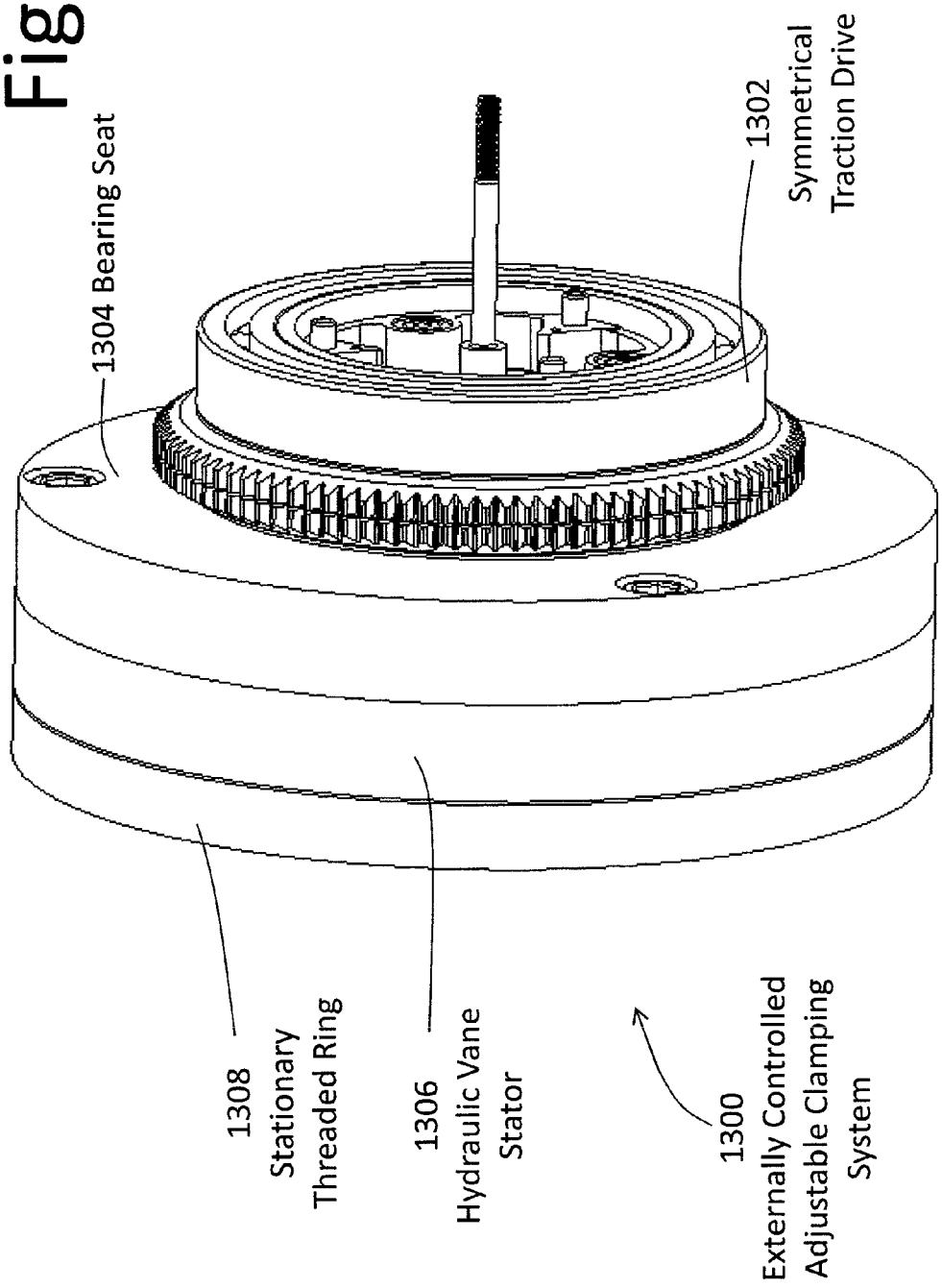
FIG. 13A is a schematic illustration of another embodiment of an externally controlled adjustable clamping system.

FIG. 13A is a schematic illustration of another embodiment of an externally controlled adjustable clamping system 1300. As shown in FIG. 13A, the externally controlled adjustable clamping system has a stationary threaded ring 1308 that is disposed adjacent to a hydraulic vane stator 1306. Bearing seat 1304 is disposed adjacent to the symmetrical traction drive 1302 to generate forces on the ring bearings in the symmetrical traction drive 1302, as disclosed more fully in FIG. 13B.

Figure 13B:
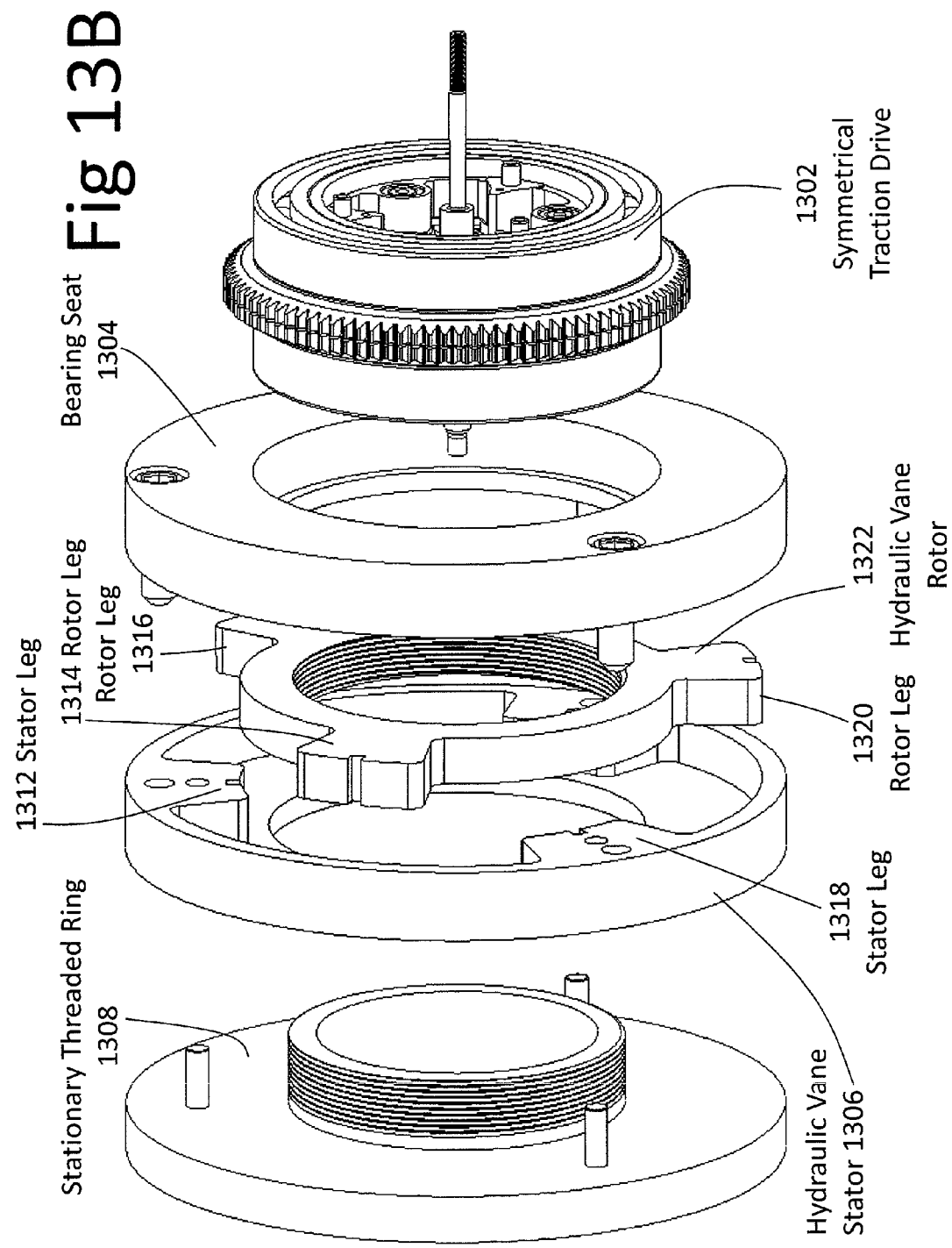
FIG. 13B is a schematic exploded view of the embodiment of the externally controlled adjustable clamping system of FIG. 13A.

FIG. 13B is a schematic exploded view of the embodiment of the externally controlled adjustable clamping system 1300, illustrated in FIG. 13A. As shown in FIG. 13B, the stationary threaded ring 1308 is coupled to a housing and does not rotate or move in a lateral direction. The hydraulic vane stator 1306 is coupled to, and secured to, the stationary threaded ring 1308 via the posts shown on the stationary threaded ring 1308 and the openings on stator legs 1312, 1318. A hydraulic vane rotor 1322 is disposed within the opening of the hydraulic vane stator 1306. The hydraulic vane rotor has three rotor legs 1314, 1316, 1320. Upon application of hydraulic fluid pressure to the cavity within the hydraulic vane stator 1306, pressure from the hydraulic fluid is asserted on the rotor legs 1314, 1316, 1320, which causes the hydraulic vane rotor 1322 to rotate. Since the hydraulic vane rotor 1322 is threaded onto the threads of the stationary threaded ring 1308, lateral movement is created in the hydraulic vane rotor 1322. Rotational movement of the hydraulic vane rotor 1322 creates the lateral movement, which creates or releases pressure on the bearing seat 1304. Bearing seat 1304 is disposed against the ring gear bearings (shown in FIG. 13C) in the symmetrical traction drive to adjust the clamping pressure on the ring gears.

FIG. 13C is a cross-sectional view of the externally controlled adjustable clamping system 1300 illustrated in FIGS. 13A and 13B. As shown in FIG. 13C, the hydraulic vane rotor 1322 is engaged with the stationary threaded ring 1308 via the threads. As the hydraulic vane rotor 1322 rotates, with respect to the stationary threaded ring 1308, the hydraulic vane rotor 1322 moves laterally, as illustrated in FIG. 13C. The lateral movement adjusts the position and pressure on the bearing seat 1304. The bearing seat engages the ring gear bearing outer race 1324, which creates a clamping force on the ring gears 1326.

FIG. 14A is a schematic perspective view of another embodiment of an externally controlled adjustable clamping system 1400. As shown in FIG. 14A, a forcer 1402 engages a magnet assembly 1404, that causes the magnet assembly 1404 to rotate and adjust the clamping pressure on the symmetrical traction drive 1406. The manner in which this occurs is more fully disclosed with respect to FIG. 14B.

FIG. 14B is a schematic cutaway view of the embodiment of FIG. 14A. As shown in FIG. 14B, balls, such as balls 1410, are mounted in grooves in a stationary ball screw 1408. As the ring gear bearing seat 1412 rotates in response to the forcer 1402, the ring gear bearing seat 1412 moves laterally and applies force to ring gear bearing outer race 1414. The grooves in the stationary ball screw 1408 are disposed in a spiral, so that lateral movement of the ring gear bearing seat 1412 is created when the ring gear bearing seat 1412 is rotated by the forcer 1402. Forces on the ring gear bearing outer race 1414 adjust the clamping force in the symmetrical traction drive 1406. Magnet assembly 1404 is attached to the ring gear bearing seat 1412 and causes the ring gear bearing seat 1412 to rotate in response to an electrical field generated by the forcer 1402.

Figure 15:
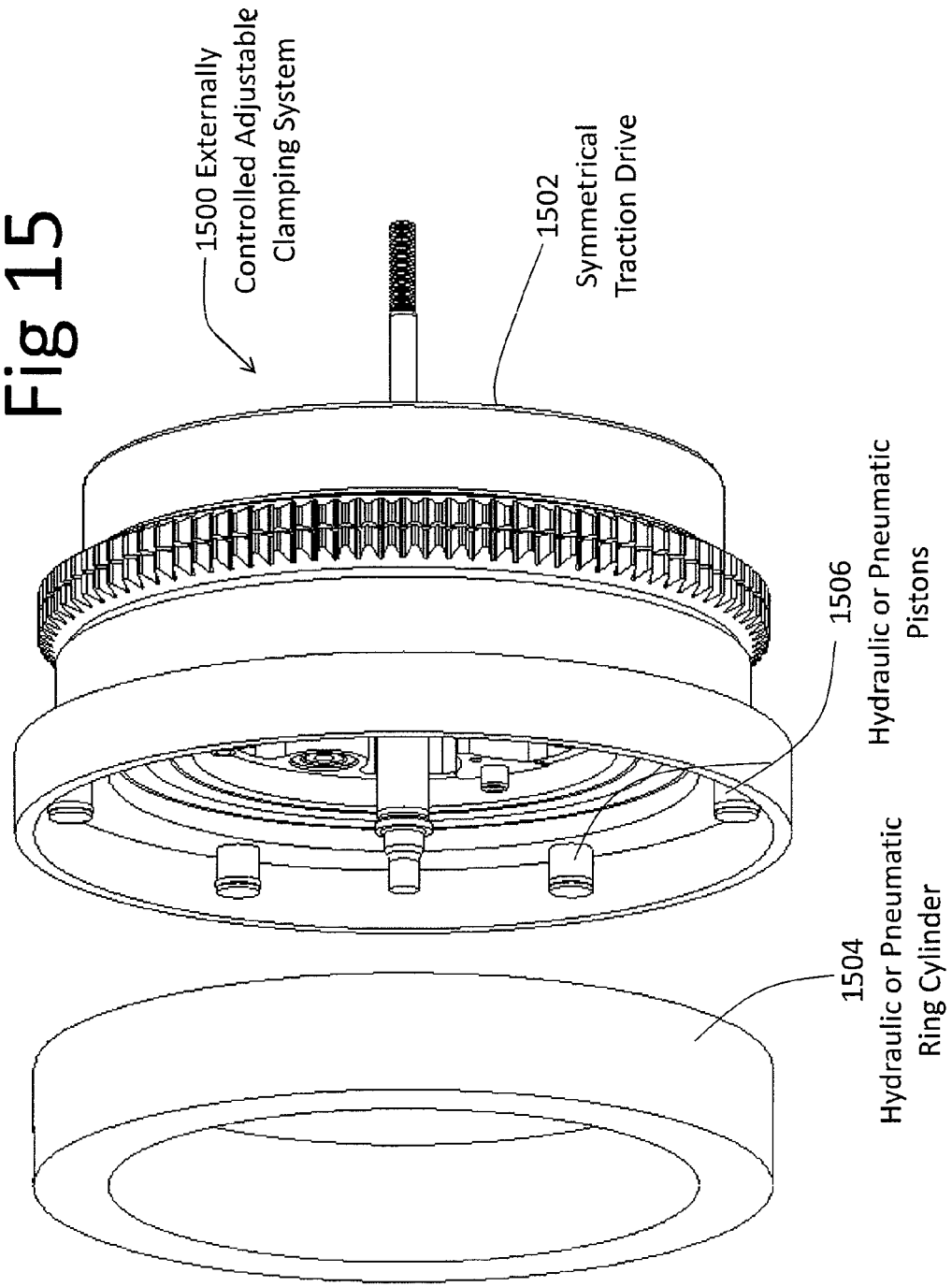
FIG. 15 is a schematic exploded view of another embodiment of an externally controlled adjustable clamping system.

FIG. 15 is a schematic exploded view of another embodiment of an externally controlled adjustable clamping system 1500. As illustrated in FIG. 15, a hydraulic or pneumatic ring cylinder 1504 engages a plurality of hydraulic or pneumatic pistons 1506. The hydraulic or pneumatic ring cylinder 1504 is stationary and is attached to a housing. When hydraulic or pneumatic pressure is applied to the hydraulic or pneumatic ring cylinder 1504, the hydraulic or pneumatic pistons 1506 move and create a force on the symmetrical traction drive 1502.

Figure 16:
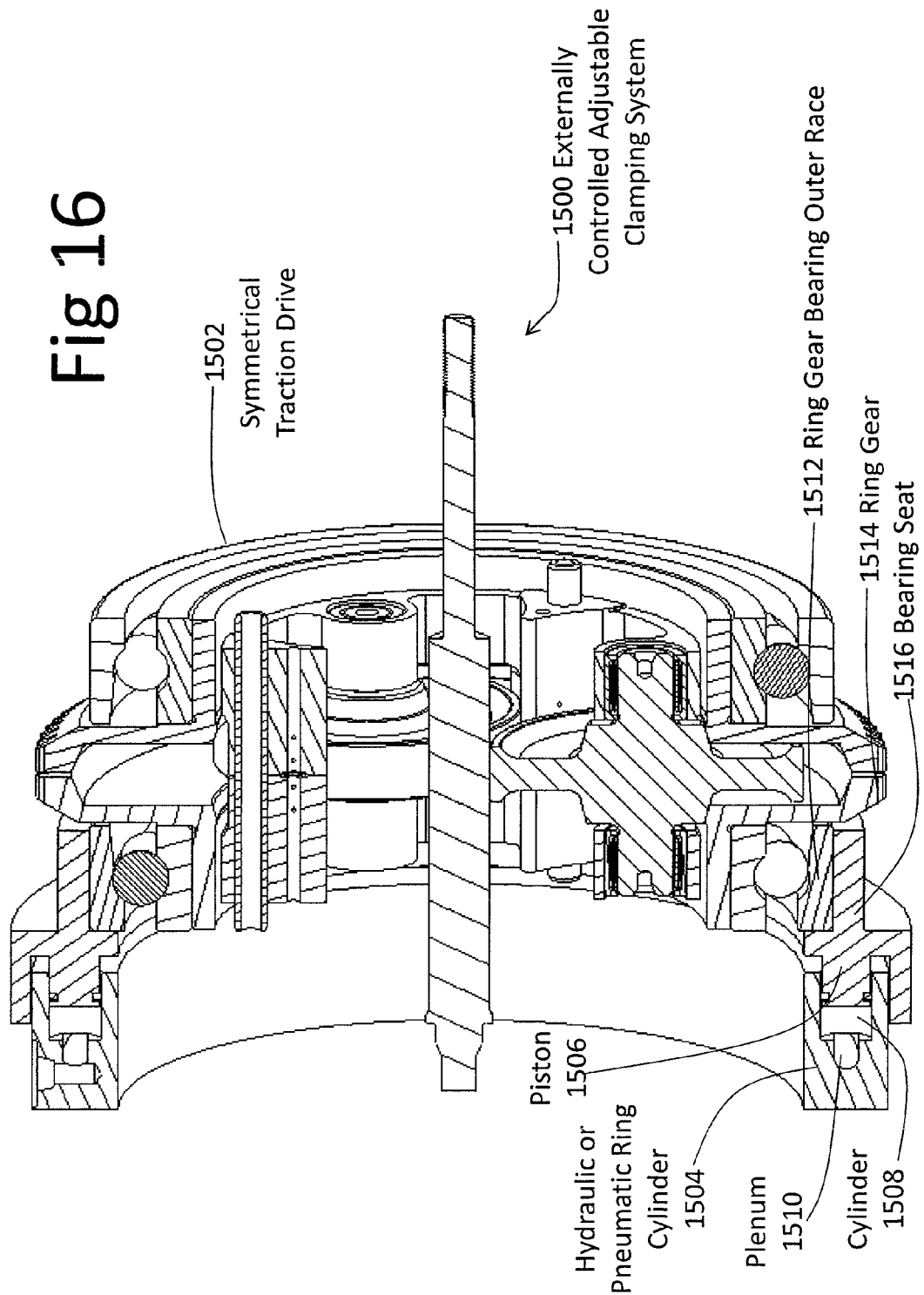
FIG. 16 is a schematic cutaway view of the externally controlled adjustable clamping system of FIG. 15.

FIG. 16 is a schematic cutaway view of the externally controlled adjustable clamping system 1500, illustrated in FIG. 15. As illustrated in FIG. 16, hydraulic or pneumatic pressure is inserted within the cylinder 1508, disposed in the hydraulic or pneumatic ring cylinder 1504. Plenum 1510 connects each of the cylinders 1508 so that an equal amount of hydraulic or pneumatic pressure is created in each of the cylinders 1508. The pistons, such as piston 1506, react to the pneumatic or hydraulic pressure, so that the bearing seat 1516 moves laterally, as illustrated in FIG. 16, and generates a force on the ring gear bearing outer race 1512. This force is transmitted to the ring gear 1514 to create the desired clamping force on the ring gear 1514 and an equal reactive force on the other ring gear, in response to the applied pneumatic or hydraulic pressure. In this manner, the desired clamping force is created in the symmetrical traction drive 1502.

Figure 17:
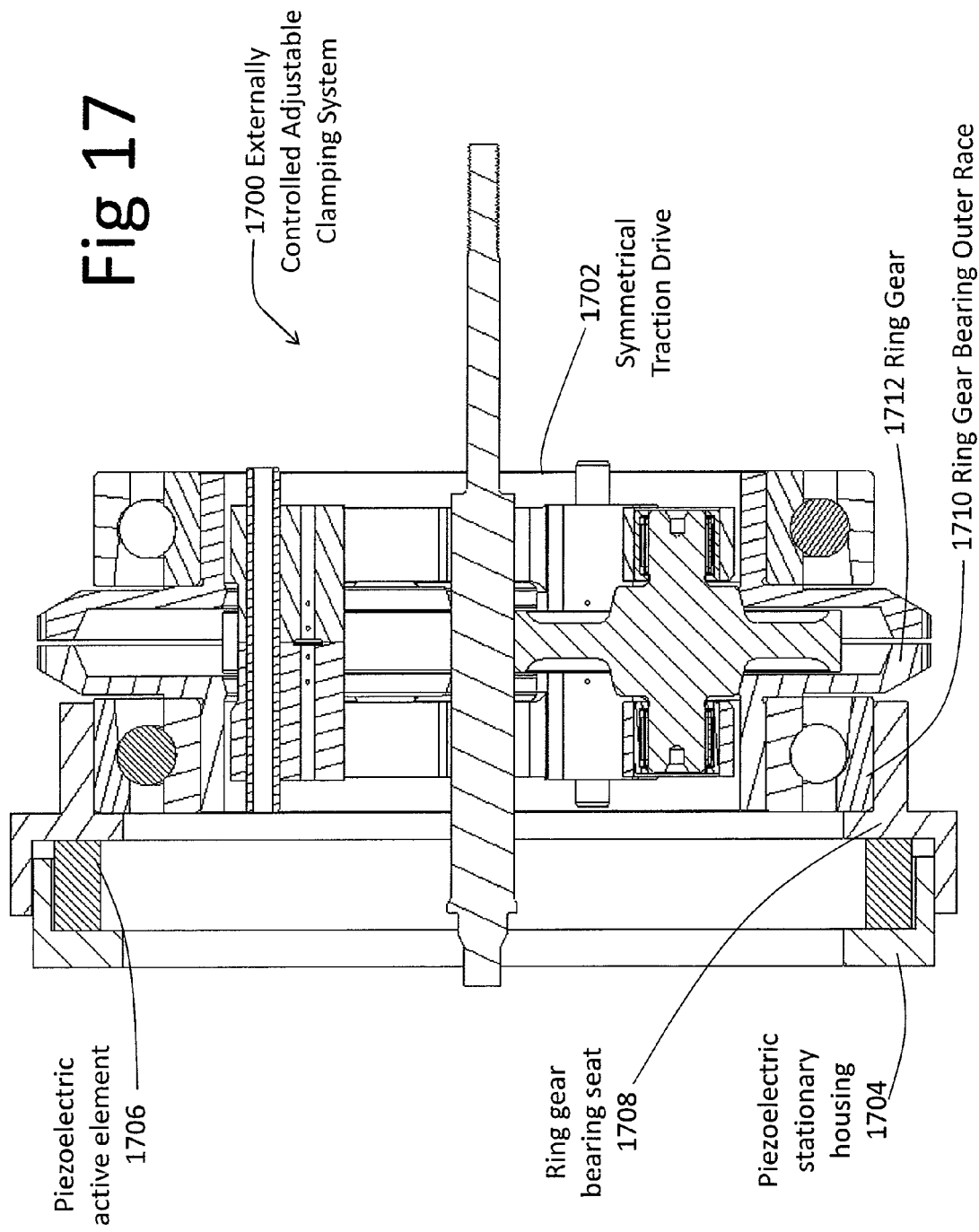
FIG. 17 is a schematic cross-sectional view of another embodiment of an externally controlled adjustable clamping system.

FIG. 17 is a schematic cross-sectional view of another embodiment of an externally controlled adjustable clamping system 1700. As illustrated in FIG. 17, a desired clamping force is generated in the symmetrical traction drive 1702 using piezoelectric active element 1706. The piezoelectric active element 1706 is mounted on a piezoelectric stationary housing 1704. When a voltage is applied to the piezoelectric active element 1706, the piezoelectric active element 1706 expands proportionally with the applied voltage. The expansion of the piezoelectric active element 1706 causes the ring gear bearing seat 1708 to move laterally and apply a force to the ring gear bearing outer race 1710. The force on the ring gear bearing outer race creates a clamping force on ring gear 1712. In this manner, a voltage can be used to create the desired clamping force on the ring gear 1712. A reactive force is created in an equal and opposite direction on the other ring gear, in the same manner as disclosed above.

Figure 18:
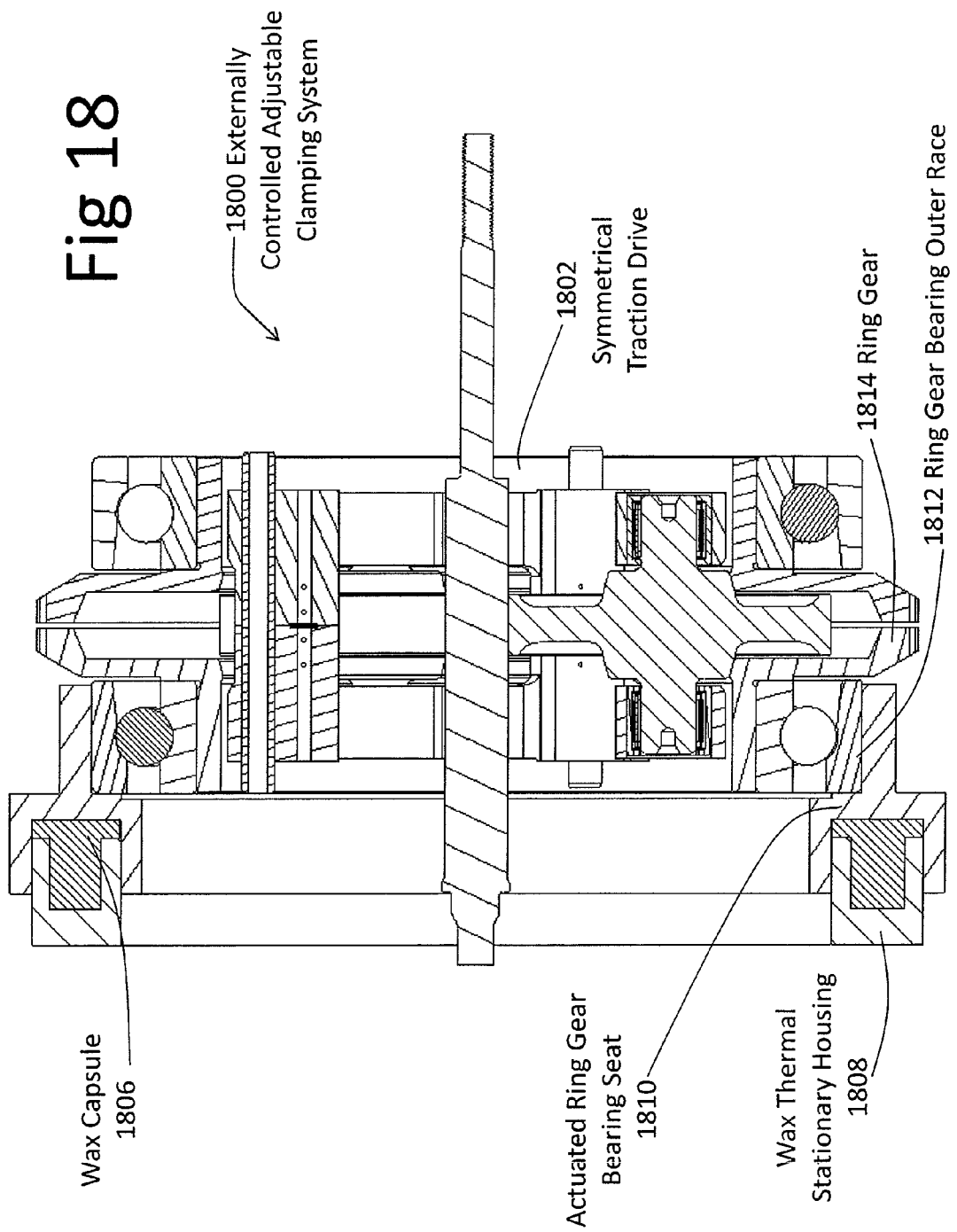
FIG. 18 illustrates another embodiment of an externally controlled adjustable clamping system.

FIG. 18 illustrates another embodiment of an externally controlled adjustable clamping system 1800. A clamping force is created in the symmetrical traction drive 1802 by a wax capsule 1806. Wax capsule 1806 expands in the presence of heat, which may be generated by an electric current. Of course, the piezoelectric active element 1706 and the wax capsule 1806 can be replaced with any material that expands in the presence of a controlled input, such as voltage or current, or other controlled medium. The wax capsule 1806 is mounted in the wax thermal stationary housing 1808, so that expansion of the wax capsule 1806 causes the actuated ring gear bearing seat 1810 to move laterally. This causes a force to be applied on the ring gear bearing outer race 1812, which is transferred to ring gear 1814, creating the desired clamping force.

Figure 19:
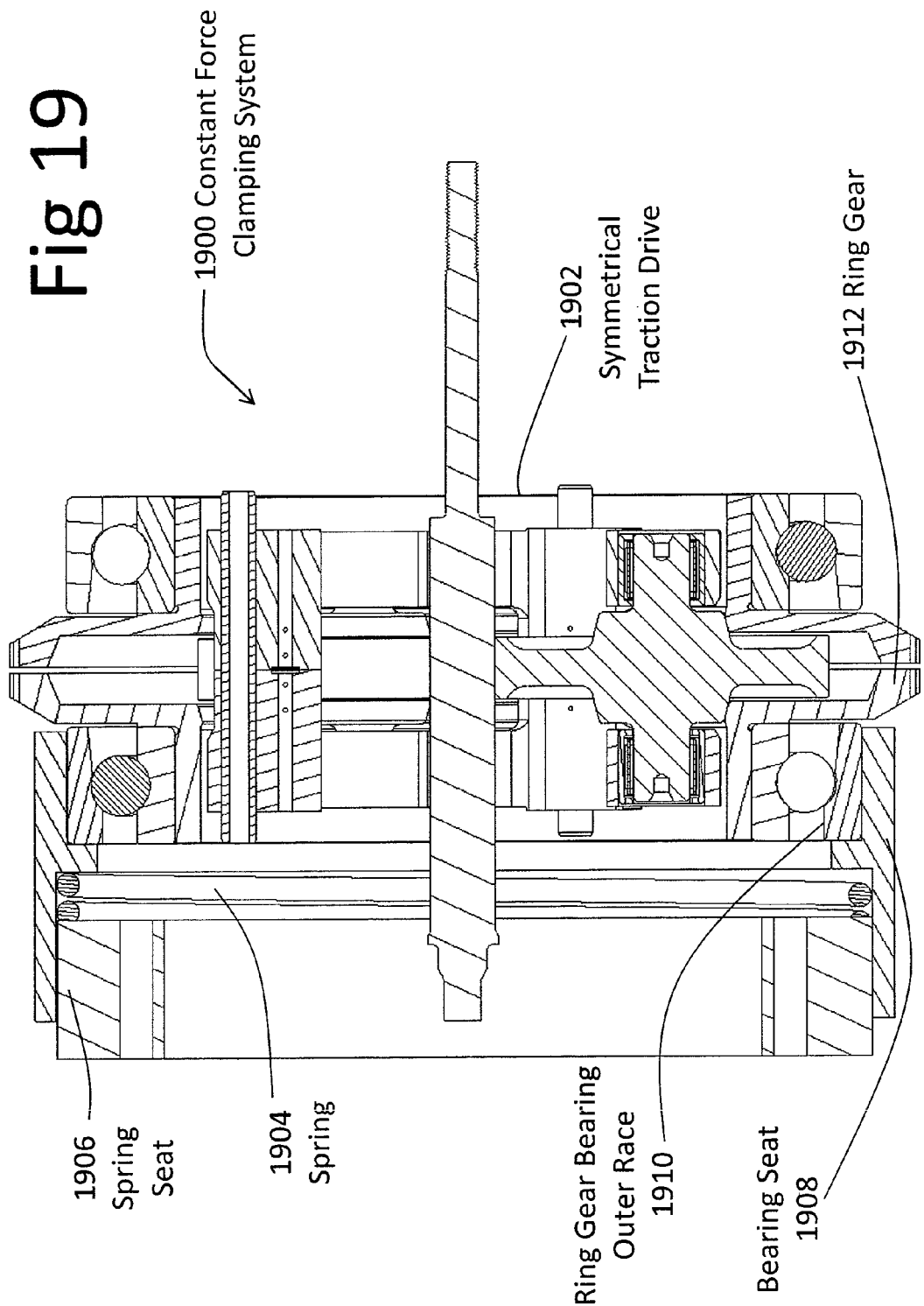
FIG. 19 is a schematic cutaway view of an embodiment of a constant force clamping system.

FIG. 19 is a schematic cutaway view of embodiment of a constant force clamping system 1900. As illustrated in FIG. 19, a spring 1904 is situated between bearing seat 1908 and spring seat 1906. Spring seat 1906 is stationary and is mounted to a housing. Spring 1904 creates a constant pressure on the bearing seat 1908, which is transferred to the ring gear bearing outer race 1910. The force on the ring gear bearing outer race 1910 is transferred to the ring gear 1912 to create the desired clamping force in the symmetrical traction drive 1902, based upon the strength of the spring 1904.

Figure 20:
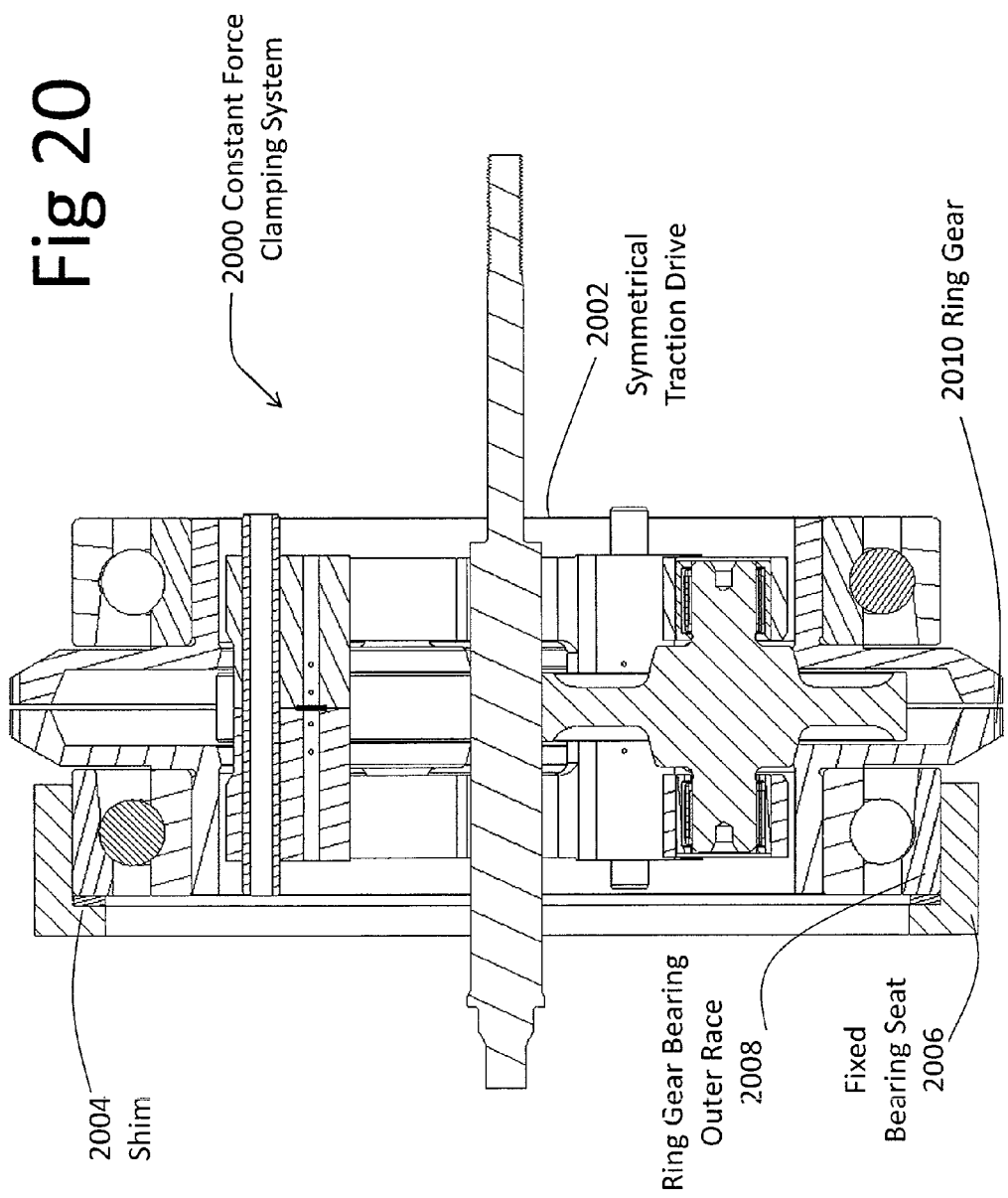
FIG. 20 is a schematic cross-sectional view of another embodiment of a constant force clamping system.

FIG. 20 is a schematic cross-sectional view of another embodiment of a constant force clamping system 2000. As illustrated in FIG. 20, fixed bearing seat 2006 is stationary and secured to a housing. Shim 2004 is inserted between the fixed bearing seat 2006 and the ring gear bearing outer race 2008. Shim 2004 creates a substantially constant pressure on the ring gear bearing outer race 2008, which is transferred to ring gear 2010. In this fashion, a constant clamping force is created in the symmetrical traction drive 2002 based upon the size of the shim 2004. The shim can be replaced after a certain time period if traction surfaces become worn.

FIG. 21 is a schematic cutaway view of an embodiment of an automatic variable clamping system 2100. As illustrated in FIG. 21, ball 2112 is mounted in a sloped ramp 2108 in ball race 2104. Similarly, ball 2114 is mounted in a sloped ramp 2110 in ball race 2106. As greater torque is applied to either the shaft 2122 or the ring gears 2116, balls 2112, 2114 move in the sloped ramps 2108, 2110, respectively, to automatically apply the desired amount of clamping pressure to the ring gears 2116 of the symmetrical traction drive 2102. The amount of torque applied to the shaft 2122, or ring gears 2116, controls the amount that the balls 2112, 2214 move within the sloped ramps 2108, 2110, and consequently the amount of clamping force that is created in the automatic variable clamping system 2100. The traction rings 2118, 2120 move laterally in response to movement of the balls 2112, 2114 in sloped ramps 2108, 2110, respectively. Traction rings 2118, 2120 can move freely in a lateral direction and are coupled to the ball races 2104, 2106 by balls 2112, 2114.

Figure 22:
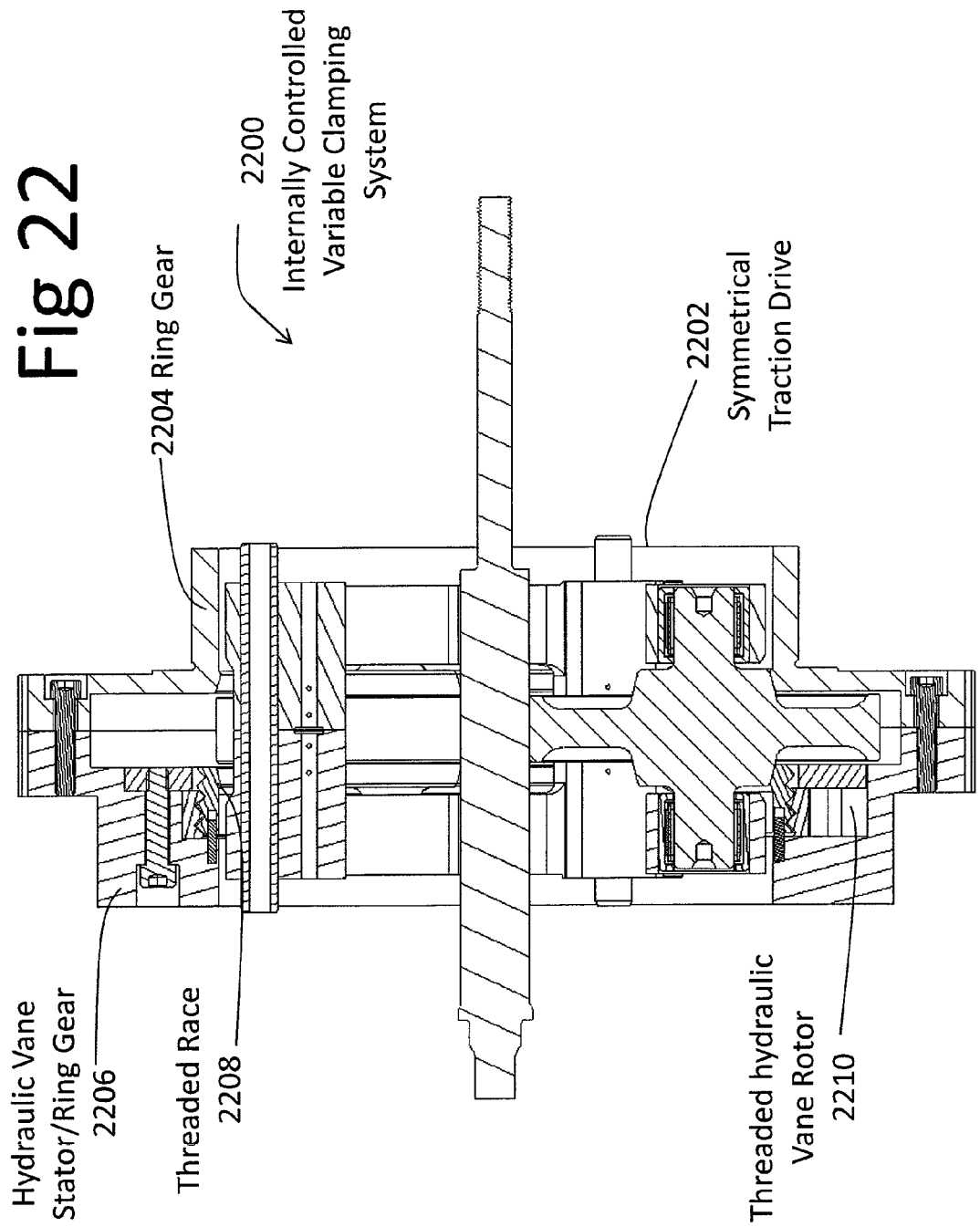
FIG. 22 is a schematic cross-sectional view of another embodiment of an automatic variable clamping system.

FIG. 22 is a schematic cross-sectional view of another embodiment of an automatic variable clamping system 2200. As illustrated in FIG. 22, clamping forces are automatically generated in the symmetrical traction drive 2202. The system utilizes a hydraulic vane stator/ring gear 2206 and a threaded hydraulic vane rotor 2210. The threaded hydraulic vane rotor 2210 operates in a manner similar to that disclosed in FIG. 13B. However, the threaded race 2208, as shown in FIG. 22, is stationary relative to the threaded hydraulic vane rotor 2210. When the threaded hydraulic vane rotor 2210 rotates in the threaded race 2208, translative motion of the threaded hydraulic vane rotor 2210 is created, which generates a clamping force between the hydraulic vane stator/ring gear 2206 and the threaded race 2208. Ring gear 2204 is connected directly to hydraulic vane stator/ring gear 2206.

Figure 23:
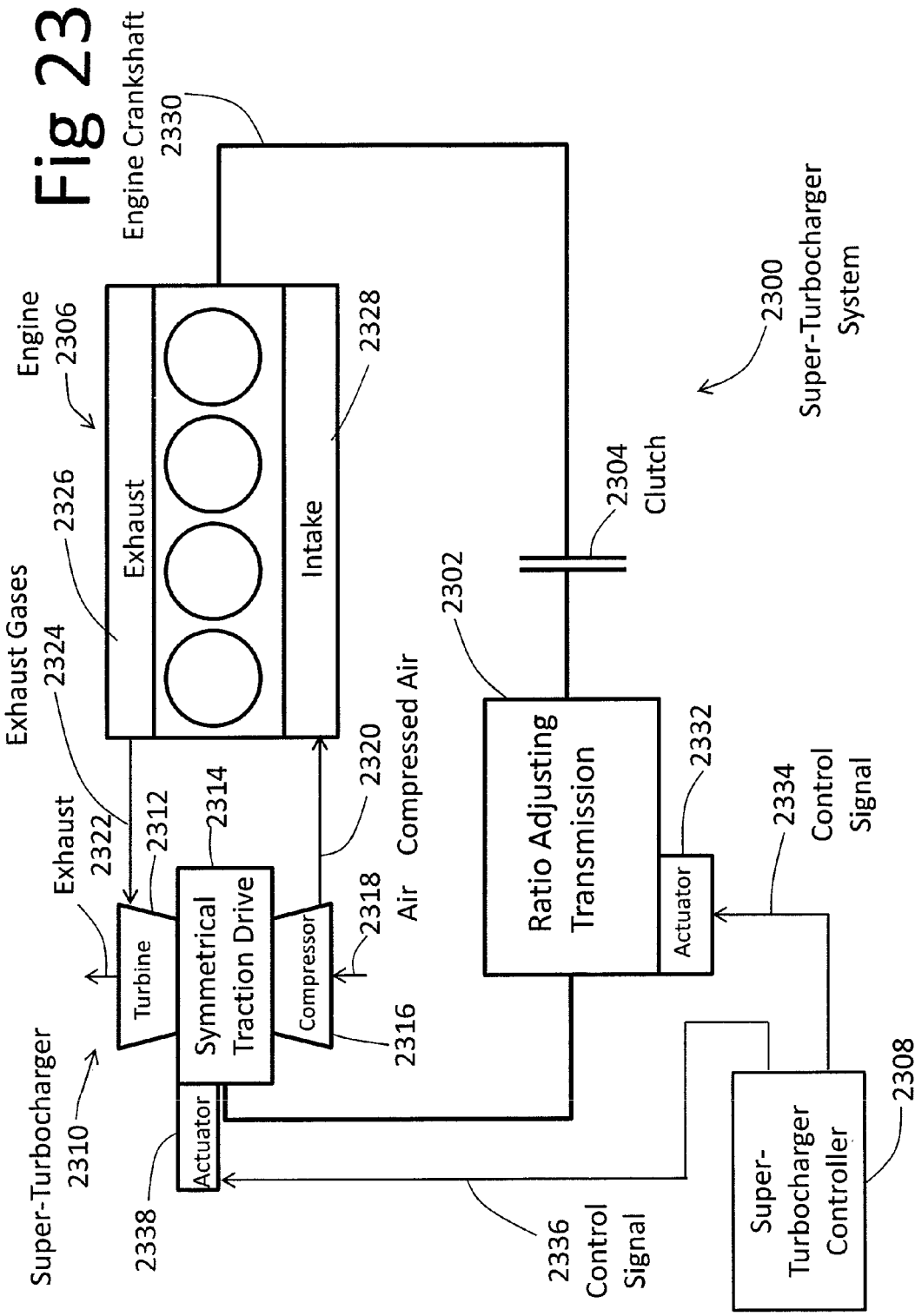
FIG. 23 is a schematic block diagram illustrating a super-turbocharger system.

FIG. 23 is a schematic block diagram illustrating a super-turbocharger system 2300. As disclosed in FIG. 23, a ratio adjusting transmission 2302 is coupled to a clutch 2304. Clutch 2304 is coupled to the engine crankshaft 2330 of engine 2306. Super-turbocharger controller 2308 generates control signal 2334, which is applied to actuator 2332, which actuates and controls the ratio adjusting transmission 2302. Ratio adjusting transmission 2302 is coupled to the low speed side of the symmetrical traction drive 2314 of super-turbocharger 2310. Turbine 2312 and compressor 2316 are coupled to the high speed side of the symmetrical traction drive 2314. Compressor 2316 takes in air 2318 to generate a source of compressed air 2320 that is applied to intake 2328 of engine 2306. Turbine 2312 receives exhaust gases 2324 from exhaust 2326 of engine 2306. Turbine 2312 then exhausts the exhaust gases from the exhaust 2322. Super-turbocharger controller 2308 generates control signal 2336, which is applied to actuator 2338 that controls the symmetrical traction drive 2314. The ratio adjusting transmission 2302 adjust the overall ratio from the crankshaft 2330 to the low speed side of the symmetrical traction drive 2314. This allows the turbine 2312 and compressor 2316 to spin at a desired speed under different operating conditions. The ratio adjusting transmission 2302 can be a fixed ratio transmission, or variable ratio transmission. For example, some systems have a narrow operating band, such as generators. A fixed ratio transmission 2302 can be used for those types of systems. However, for many other systems, a wide band of operating points is necessary, which results in the necessity to use a variable ratio transmission. Variable ratio transmissions may comprise continuously variable transmissions, infinitely variable transmissions or multiple ratio transmissions with discreet gear sets, such as ten speed dual clutch transmissions, as one example. By providing a variable ratio, the super-turbocharger controller 2308 is able to adjust the overall ratio of the super-turbocharger 2310 and cause the speed of the turbine 2312 to match variable desired speeds over a wide range of operating conditions. The ratio adjusting transmission 2302 may include fixed gears, mechanical CVTs, speed summing CVTs with variators, including hydraulics, pneumatics, electric motors, and mechanical variators. Discreet gear transmissions, with the ability to shift between gears, can also be used, such as automatic transmissions and dual clutch transmissions. Clutch 2304 permits the super-turbocharger system 2300 to be entirely decoupled from engine 2306, which can be useful for operating points, including idle, in which the super-turbocharger 2310 does not need to be spinning at all, and if connected, comprises a parasitic drag on engine 2306. The clutch 2304 can be used in combination with any of the ratio adjusting transmissions 2302 described herein.

Figure 24:
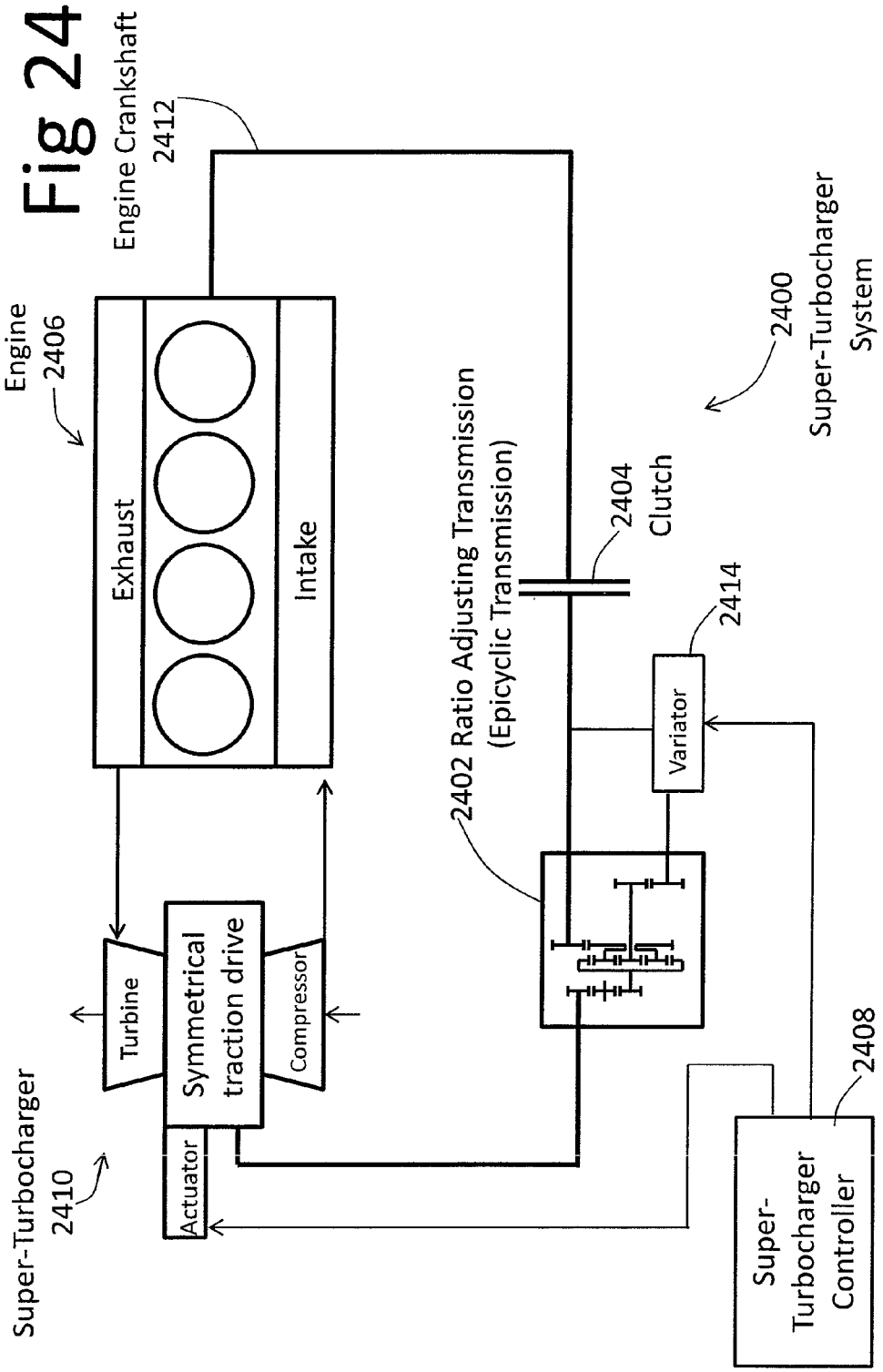
FIG. 24 is another embodiment of a superturbocharged system.

FIG. 24 illustrates another embodiment of the superturbocharged system 2400 that includes an example of a ratio adjusting transmission 2402. The specific ratio adjusting transmission 2402, illustrated in FIG. 24, is a speed summing differential, continuously variable transmission, which is otherwise known as an epicyclic transmission. The epicyclic transmission uses epicyclic gearing, which consists of a gear system that has one or more outer gears, or planet gears, revolving about a central sun gear. Typically the planet gears are mounted on a moveable arm or carrier, which itself may rotate relative to the sun gear. Epicyclic gearing systems also incorporate the use of an outer ring gear, or annulus, which meshes with the planet gears. Accordingly, the three basic components of an epicyclic gear are the sun gear, which is the central gear, the planet carrier, which holds one or more peripheral planet gears, which are all the same size and are meshed with the sun gear, and the annulus, which is the outer ring with inward facing teeth that mesh with the planet gears. In the epicyclic transmission 2402, illustrated in FIG. 24, variator 2414 can be used to constrain one or more of these three components so that the overall ratio of the ratio adjusting transmission 2402 can be adjusted. By controlling one of the three components, one of the other two remaining components can function as an input, while the other component can act as an output. The ratio of the input rotation to the output rotation is dependent upon the number of teeth in each gear and the manner in which the variator 2414 controls the other component. For example, variator 2414 may be a motor that rotates the annulus to control the ratio of the sun gear to the planet gears. Alternatively, the variator 2414 may connect to the sun gear and the planet gears, in which case the ring gear or annulus is used as the output to the symmetrical traction drive of the super-turbocharger 2410. Since a variator 2414 can be used to control the ratio of the ratio adjusting transmission 2402, the super-turbocharger controller 2408 is capable of varying the gear ratios between the crank shaft 2412, which is coupled to the engine 2406, and the symmetrical traction drive of the super-turbocharger 2410. Variator 2414 may comprise a wide variety of devices, including coupled hydraulic pumps, electric motors, mechanical continuously variable transmissions, or other devices.

FIG. 25 is a schematic diagram of an embodiment of a control system 2500. As shown in FIG. 25, various inputs 2504 from vehicle sensors are sent to the input 2508. These inputs may include engine rpm, a throttle position, measured temperatures, pressures, wheel spin, accelerometers, throttle, pedal position or driver input. Control inputs 2506 are received by the control input device 2516 of the control unit 2502. The control input may include manifold pressure, air mass flow, compressor speed, fuel flow, boost pressure, CVT ratio, etc. The vehicle sensor inputs 2508 are compared in comparator 2510 with the engine operation maps 2512 and the result is sent to a desired state 2514. Control inputs 2506 are transmitted directly to the control loop 2518. In addition, the state of the actuator, such as actuator 2338 of FIG. 23, is also sent to the control loop. The desired state information 2514 and the actuator state 2520 are also forwarded to the control loop 2518. The control loop may comprise a proportional integral derivative controller (PID controller), which is a controlled loop feedback controller. PID controllers calculate an error value as a difference between a measured process variable in a desired setpoint. PID controllers then attempt to minimize the error by adjusting the process control inputs. PID controllers use proportional, integral and derivative values to generate corrections. The proportional value (P) is representative of the present error, the (I) value is representative of the accumulation of past errors and the (D) value is the future errors, which is calculated using the derivative based upon the current rate of change. The weighted sum of these three is used as a controller output 2522. Additional features of the control loop may include feed forward, compressor efficiency map, and torque estimators. Controller output 2522 generates a control signal 2524 which is applied to the super-turbocharger actuator 2526, such as super-turbocharger actuator 2332 of FIG. 23. In this manner, the overall ratio can be determined for the super-turbocharger. Actuator, such as actuator 2332 of FIG. 23, and variator 2414 of FIG. 24, utilize a control signal to adjust the ratio of the ratio adjusting transmission 2302 or the ratio adjusting transmission 2402. The operation of control systems is further described in U.S. patent application Ser. No. 13/191,407, filed Jul. 26, 2011, entitled "Superturbocharger Control Systems." which is specifically incorporated herein by reference for all that it discloses and teaches.

FIG. 26 is a schematic block diagram of an embodiment of a super-turbocharger system that is used in conjunction with electric motor/generators. As shown in FIG. 26, super-turbocharger 2610 functions with the engine 2606 to increase power levels. Super-turbocharger 2610 operates in response to control signals from the super-turbocharger controller 2608. Electric motor/generator 2602 is coupled to the low speed side of the symmetrical traction drive of the super-turbocharger 2610 via shaft 2624. The motor controller 2622 operates in response to control signals from the super-turbocharger controller 2608. Engine crank shaft 2604 of engine 2606 is coupled to an electric motor/generator 2612. The electric motor/generator 2612 is coupled by wire 2616 to motor controller 2622. The electric motor/generator 2612 can be used as a generator to charge the battery bank 2614, or as a motor for propelling a vehicle or other desired uses. Similarly, electric motor/generator 2602 is connected by wire 2620 to motor controller 2622. Electric motor/generator 2602 can be used to charge the battery bank 2614 by using the electric generator. Alternatively, the electric motor/generator 2602 can be used as a motor to drive the low speed end of super-turbocharger 2610. Battery 2614 is connected by wire 2618 to the motor controller 2622 so that the battery 2614 can be charged, or to drive the electric motors of electric motor/generators 2602, 2612 depending upon operating conditions of the system.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of transferring rotational mechanical energy in a symmetric traction drive comprising:
    obtaining a central shaft having a shaft traction surface;
    obtaining symmetric rollers having roller shafts, inner roller traction surfaces and outer roller traction surfaces;
    mounting said roller shafts of said symmetric rollers in carriers so that said outer roller traction surfaces of said rollers are disposed to rotationally mate with said shaft traction surface of said central shaft to create a shaft traction interface, said carriers having posts that provide structural integrity to said carriers while allowing said carriers to flex on portions of said carriers between said posts where said roller shafts of said symmetric rollers are mounted on said carriers, which allows movement of said roller shafts of said symmetric rollers in a radial direction with respect to said central shaft;
    placing traction rings on opposite sides of said symmetric rollers so that traction ring traction surfaces of said traction rings mate with said inner roller traction surfaces of said symmetric rollers to create a sloped traction interface that transfers said rotational mechanical energy between said traction rings and said symmetric rollers;
    forcing said traction rings together which generates forces on said sloped traction interface, causing said symmetric rollers to move toward said central shaft and increase pressure on said shaft traction interface that creates friction in said shaft traction interface to transfer said rotational mechanical energy between said central shaft and said symmetric rollers.

2. The method of claim 1 wherein said process of placing said traction rings on opposite sides of said rollers further comprises:
    placing said traction rings on opposite sides of said rollers so that said traction ring traction surfaces on said traction rings mate with said inner roller traction surfaces of said rollers at an angle of approximately one degree to approximately twenty degrees, which creates leverage in forcing said outer traction surfaces against said shaft traction surface.

3. The method of claim 1 wherein said process of mounting said symmetric rollers in said carriers further comprises:
    mounting said symmetric rollers in said carriers so that said symmetric rollers can laterally translate between said carriers, and forces on said inner roller traction surfaces of said symmetric rollers, generated by said sloped traction surfaces on said traction rings, are substantially balanced on both sides of said symmetric rollers.

4. The method of claim 1 further comprising:
    providing traction fluid under pressure to oil tubes in said carriers;
    spraying said traction fluid from said carriers on said sloped traction interface and said shaft traction interface to increase said friction.

5. The method of claim 4 wherein said process of spraying said traction fluid from said carriers on said sloped traction interface and said shaft traction interface comprises:
spraying said traction fluid from said carriers on a closing side of said sloped traction interface and said shaft traction interface to supply traction fluid to said sloped traction interface and said shaft traction interface.

6. The method of claim 5 wherein said process of spraying said traction fluid from said carriers on said sloped traction interface and said shaft traction interface comprises:
spraying said traction fluid from said carriers on an opening side of said sloped traction interface and said shaft traction interface to cool said sloped traction interface and said shaft traction interface.

7. The method of claim 1 wherein said traction rings comprise ring gears.

8. The method of claim 1 wherein traction rings comprise a pair of rings that are separate from a set of ring gears.

9. The method of claim 2 further comprising:
mounting said traction rings on bearings;
using set screws that adjust the position of said bearings on a mounting surface to force said traction rings together.

10. The method of claim 1 wherein said process of forcing said traction rings together comprises:
using an externally controlled adjustable clamping process to force said traction rings together.

11. The method of claim 10 wherein said process of using an externally controlled adjustable clamping process comprises:
using a motor to rotate a bearing seat to create lateral translative movement of said bearing seat to vary clamping forces on said traction rings.

12. The method of claim 11 further comprising:
using a controller that generates a control signal to control said motor.

13. The method of claim 12 wherein said lateral translative movement is created by a threaded interface.

14. The method of claim 12 wherein said translative movement is created by ball ramps.

15. The method of claim 12 wherein said translative movement is created by ball screws.

16. The method of claim 10 wherein said externally controlled adjustable clamping process comprises:
controlling application of hydraulic pressure to a hydraulic translative device that controls said force applied to said traction rings.

17. The method of claim 10 wherein said externally controlled adjustable clamping process comprises:
controlling application of pneumatic pressure to a pneumatic translative device that controls said force applied to said traction rings.

18. The method of claim 10 wherein said process of using an externally controlled clamping process comprises:
using a threaded hydraulic vane rotor that rotates and generates a translative movement whenever torque is applied to said traction rings.

19. The method of claim 10 wherein said externally controlled adjustable clamping process comprises:
controlling voltage applied to a piezoelectric element that controls said force applied to said traction rings.

20. The method of claim 1 wherein said process of forcing said traction rings together comprises:
using a substantially constant force clamping process to force said traction rings together.

21. The method of claim 20 wherein said process of using a substantially constant force clamping process comprises using a spring to force said traction rings together.

22. The method of claim 20 wherein said process of using a substantially constant force clamping process comprises using a shim to force said traction rings together.

23. The method of claim 1 wherein said process of forcing said traction rings together comprises:
using an automatic variable clamping process to force said traction rings together.

24. The method of claim 23 wherein said process of using an automatic variable clamping process comprises:
using a plurality of balls that are disposed in a sloped channel in a ball race that generate a translative movement in said traction ring, whenever torque is applied to said ball race.

25. The symmetric traction drive of claim 23 further comprising:
an automatic variable clamping actuator that forces said traction rings together.

26. The symmetric traction drive of claim 25 wherein said automatic variable clamping actuator comprises a plurality of balls that are disposed in a sloped channel in a ball race that generate a translative movement in said traction rings whenever torque is applied to said ball race.

27. The method of claim 1 wherein said method of transferring rotational mechanical energy in a symmetric traction drive comprises a method of transferring rotational mechanical energy in a symmetric traction drive between a super-turbocharger shaft that connects a compressor and a turbine and an engine that is connected to said super-turbocharger.

28. A symmetric traction drive comprising:
a central shaft having a shaft traction surface;
symmetric rollers having roller shafts, inner roller traction surfaces and outer roller traction surfaces;
carriers that hold said roller shafts so that said outer roller traction surfaces of said symmetric rollers are disposed to rotationally mate with said shaft traction surface;
traction rings placed on opposite sides of said symmetric rollers that have sloped ring traction surfaces that mate with said inner roller traction surfaces of said symmetric rollers to create a sloped traction interface that transfers rotational mechanical energy between said symmetric rollers and said traction rings when said traction rings are forced together causing said carriers to flex where said carriers hold said roller shafts, so that said outer roller traction surfaces of said symmetric rollers are forced against said shaft traction surface to create a shaft traction interface that transfers rotational mechanical energy between said symmetric rollers and said shaft;
posts on said carriers that provide structural integrity to said carriers while allowing said carriers to flex on portions of said carriers between said posts where said roller shafts are mounted on said carriers, which allows movement of said roller shafts in a radial direction with respect to said central shaft, and which causes a variation in pressure on said shaft traction interface, said movement of said roller shafts caused by variations of forces on said sloped traction interface when said traction rings are forced together.

29. The symmetric traction drive of claim 28 wherein said inner roller traction surfaces of said symmetric rollers further comprise:
inner roller traction surfaces on two opposing sides of said symmetric rollers that mate with said sloped ring traction surfaces of said traction rings, said traction rings disposed on said two opposing sides of said symmetric rollers so that forces that are created on said inner roller traction surfaces are substantially balanced on said symmetric rollers and force said outer roller traction surfaces of said symmetric rollers substantially evenly against said shaft traction surface.

30. The symmetric traction drive of claim 29 further comprising:
bearings that are mounted in said carriers that allow said symmetric rollers to rotate with respect to said carriers and translate between said carriers so that forces on said inner roller traction surfaces of said symmetric rollers generated by said sloped ring traction surfaces on said traction rings are substantially balanced on each side of said symmetric rollers.

31. The symmetric traction drive of claim 30 further comprising:
a traction fluid that is pressurized in oil tubes in said carriers under pressure;
spray holes in said carriers that spray said sloped traction interface and said shaft traction interface to increase said friction of said traction interfaces.

32. The symmetric traction drive of claim 31 further comprising:
spray holes in said carriers that spray said traction fluid from said carriers on a closing side of said sloped traction interface and said shaft traction interface to supply traction fluid to said sloped traction interface and said shaft traction interface.

33. The symmetric traction drive of claim 31 further comprising:
spray holes in said carriers that spray said traction fluid from said carriers on an opening side of said sloped traction interface and said shaft traction interface to cool said sloped traction interface and said shaft traction interface.

34. The symmetric traction drive of claim 32 further comprising:
bearings mounted on said traction rings;
set screws that adjust the position of said bearings relative to a fixed surface that force said traction rings together.

35. The symmetric traction drive of claim 28 wherein said traction rings comprise a portion of at least one ring gear.

36. The symmetric traction drive of claim 28 wherein said traction rings comprise rings that are separate from at least one ring gear.

37. The symmetric traction drive of claim 28 further comprising:
an externally controlled adjustable actuator that forces said traction rings together.

38. The symmetric traction drive of claim 37 wherein said externally controlled adjustable actuator comprises a threaded hydraulic vane rotor that rotates on a threaded interface to create a translative motion in said traction rings whenever hydraulic pressure is applied to said threaded hydraulic vane rotor.

39. The symmetric traction drive of claim 37 wherein said externally controlled adjustable actuator comprises:
a motor that rotates a bearing seat to create translative movement.

40. The symmetric traction drive of claim 39 further comprising:
a controller that generates a control signal that controls said motor.

41. The symmetric traction drive of claim 40 further comprising:
a threaded interface that generates said translative movement of said bearing seat.

42. The symmetric traction drive of claim 40 further comprising:
ball ramps and balls that generate said translative movement of said bearing seat.

43. The symmetric traction drive of claim 40 further comprising:
a ball screw and balls that generate said translative movement of said bearing seat.

44. The symmetric traction drive of claim 40 further comprising:
a hydraulic pressure translative actuator that controls force applied to said traction rings.

45. The symmetric traction drive of claim 40 further comprising:
a pneumatic pressure translative actuator that controls force applied to said traction rings.

46. The symmetric traction drive of claim 40 further comprising:
a piezoelectric element that controls force applied to said traction rings.

47. The symmetric traction drive of claim 40 wherein said motor comprises an electric motor.

48. The symmetric traction drive of claim 28 further comprising:
a wax element that controls force applied to said traction rings.

49. The symmetric traction drive of claim 28 further comprising:
a substantially constant force actuator that forces said traction rings together.

50. The symmetric traction drive of claim 49 wherein said substantially constant force actuator comprises a spring.

51. The symmetric traction drive of claim 49 wherein said substantially constant force actuator comprises a shim.

52. The symmetric traction drive of claim 28 wherein said symmetric traction drive is coupled between a super-turbocharger shaft that connects a turbine and a compressor in a super-turbocharger and an engine coupled to said super-turbocharger.

53. A method of transferring rotational mechanical energy in a symmetric traction drive between an engine and a super-turbocharger that is both mechanically driven by said engine and by exhaust gases from said engine comprising:
generating turbine rotational mechanical energy in a turbine from enthalpy of said exhaust gases produced by said engine;
connecting a shaft to said turbine, said shaft having a shaft traction surface;
connecting a compressor to said shaft;
compressing intake air using said turbine rotational mechanical energy to rotate said compressor to supply compressed air to said engine;
placing a plurality of planetary roller traction surfaces of a plurality of said symmetric planetary rollers of said symmetric traction drive in contact with said shaft traction surface so that a plurality of shaft traction interfaces are created between said plurality of planetary roller traction surfaces and said shaft traction surface;
placing traction rings on opposite sides of said symmetric rollers so that traction ring traction surfaces of said traction rings mate with inner roller traction surfaces on said plurality of planetary rollers, which creates a plurality of sloped traction interfaces between said plurality of planet rollers and said ring roller;
connecting said traction rings to at least one ring roller;
forcing said traction rings together to generate forces on said sloped traction interfaces which causes said symmetric rollers to move towards said shaft traction surface of said shaft which increases pressure on said shaft traction interfaces so that said rotational mechanical energy is transferred between said traction rings and said symmetric rollers;

mechanically coupling a ratio adjusting transmission to said ring roller and said engine to transfer a portion of said turbine rotational mechanical energy to said engine or a portion of said engine rotational mechanical energy to said compressor depending upon operating conditions of said engine.

54. The method of claim 53 further comprising:
controlling said ratio adjusting transmission with a controller.

55. The method of claim 53 wherein said process of forcing said traction rings together comprises:
using an externally controlled adjustable clamping device to force said traction rings together in response to a control signal from a controller to vary the torque capacity of said symmetric traction drive depending on said operating conditions of said engine.

56. The method of claim 55 wherein said method of using an externally controlled adjustable clamping device comprises:
controlling application of hydraulic pressure to a hydraulic translative device that controls said force applied to said traction rings.

57. The method of claim 55 wherein said method of using an externally controlled adjustable clamping device comprises:
controlling application of pneumatic pressure to a pneumatic translative device that controls said force applied to said traction rings.

58. The method of claim 53 wherein said process of forcing said traction rings together comprises:
using an automatic clamping device that responds to torque transmitted through said symmetric traction drive to vary said forces on said sloped traction interfaces automatically.

59. A super-turbocharger that is both mechanically driven by engine rotational mechanical energy from an engine and turbine rotational energy comprising:
a turbine that generates said turbine rotational mechanical energy from enthalpy of exhaust gases produced by said engine;
a compressor that compresses intake air and supplies compressed air to said engine;
a shaft having portions that are connected to said turbine and said compressor, and a portion having a shaft traction surface;
a symmetric traction drive disposed around said shaft traction surface, said traction drive comprising:
a plurality of symmetric planetary rollers having a plurality of sloped inner roller traction surfaces and a plurality of outer planetary roller traction surfaces that interface with said shaft traction surface so that a plurality of shaft traction interfaces are created between said plurality of planetary roller traction surfaces and said shaft traction surface;
traction rings disposed on opposite sides of said plurality of symmetric planetary rollers having sloped traction ring surfaces, said sloped traction ring traction surfaces disposed to mate with said plurality of sloped inner roller traction surfaces to form a sloped traction interface that transfers said turbine rotational mechanical energy to said engine and said engine rotational mechanical energy to said traction rings and said plurality of planet rollers;
a ring roller that is connected to, or forms a portion of, said traction rings;
a continuously variable transmission, that is mechanically coupled to said traction drive and said engine, that transfers a portion of turbine rotational mechanical energy to said engine, or a portion of said engine rotational mechanical energy to said traction drive depending upon operating conditions of said engine.

60. The super-turbocharger of claim 59 further comprising:
a controller that generates a control signal that controls said continuously variable transmission.

61. The super-turbocharger of claim 60 further comprises:
an externally controlled adjustable clamping device that forces said traction rings together to vary the torque capacity of said symmetric traction drive depending on said operating conditions of said engine.

62. The super-turbocharger of claim 61 wherein said externally controlled adjustable clamping device comprises:
a hydraulic translative device.

63. The super-turbocharger of claim 61 wherein said externally controlled adjustable clamping device comprises:
a pneumatic translative device.

64. The super-turbocharger of claim 60 further comprising:
an automatic adjustable clamping device that forces traction rings together based on torque transmitted through said symmetric traction drive.

\* \* \* \* \*